US009659306B1

(12) United States Patent
Nour-Omid et al.

(10) Patent No.: US 9,659,306 B1
(45) Date of Patent: May 23, 2017

(54) METHOD AND SYSTEM FOR LINKING SOCIAL MEDIA SYSTEMS AND FINANCIAL MANAGEMENT SYSTEMS TO PROVIDE SOCIAL GROUP-BASED MARKETING PROGRAMS

(71) Applicant: Intuit Inc., Mountain View, CA (US)

(72) Inventors: Talia Shereen Nour-Omid, Los Angeles, CA (US); Siffat Hingorani, San Jose, CA (US); Tony Chang, Union City, CA (US); Brendan D. McDonald, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 830 days.

(21) Appl. No.: 14/033,292

(22) Filed: Sep. 20, 2013

(51) Int. Cl.
  *G06Q 30/00* (2012.01)
  *G06Q 30/02* (2012.01)
  *G06Q 50/00* (2012.01)

(52) U.S. Cl.
  CPC ......... *G06Q 30/0255* (2013.01); *G06Q 50/01* (2013.01)

(58) Field of Classification Search
  USPC ...................................... 705/14.34
  See application file for complete search history.

(56) References Cited

U.S. PATENT DOCUMENTS

| 5,353,218 | A | 10/1994 | De Lapa et al. |
| 5,754,938 | A | 5/1998 | Herz et al. |
| 5,819,285 | A | 10/1998 | Damico et al. |
| 6,341,353 | B1 | 1/2002 | Herman et al. |

(Continued)

FOREIGN PATENT DOCUMENTS

| GB | 2 430 297 | 3/2007 |
| JP | 2003-067606 | 3/2003 |

(Continued)

OTHER PUBLICATIONS

Brown, Mark Graham, "Journal for Quality & Participation," Oct./Nov. 1994, 11 pages, v17n6, Association for Quality & Participation.

(Continued)

*Primary Examiner* — James A Reagan
(74) *Attorney, Agent, or Firm* — Hawley Troxell Ennis & Hawley LLP; Philip McKay

(57) ABSTRACT

Marketing program data associated with a social group-based marketing program offered by a merchant is obtained. Access to social group identification data identifying two or more socially connected consumers and their respective financial data is obtained and analyzed to identify two or more spending and socially connected consumers. Two or more marketing program eligible spending and socially connected consumers who meet defined marketing program eligibility criteria are then identified and registered with the marketing program. Spending data associated with the registered spending and socially connected consumers is then monitored and when the spending data associated with the registered spending and socially connected consumers indicates the marketing program requirements of the social group-based marketing program have been met, the registered spending and socially connected consumers are provided the benefits of the social group-based marketing program.

21 Claims, 2 Drawing Sheets

(56) References Cited

U.S. PATENT DOCUMENTS

| | | |
|---|---|---|
| 6,363,488 B1 | 3/2002 | Ginter et al. |
| 6,450,407 B1 | 9/2002 | Freeman et al. |
| 6,493,110 B1 | 12/2002 | Roberts |
| 6,611,811 B1 | 8/2003 | Deaton et al. |
| 6,678,685 B2 | 1/2004 | McGill et al. |
| 6,757,664 B1 | 6/2004 | Cardinal et al. |
| 6,918,131 B1 | 7/2005 | Rautila et al. |
| 7,403,906 B2 | 7/2008 | Coleman |
| 7,505,913 B2 | 3/2009 | Tobin |
| 7,668,747 B2 | 2/2010 | Murphy et al. |
| 7,783,532 B2 | 8/2010 | Hsu et al. |
| 7,877,402 B1 | 1/2011 | Weiss et al. |
| 8,364,522 B1 | 1/2013 | Gevelber |
| 8,583,471 B1 | 11/2013 | Voskuhl et al. |
| 8,688,553 B1 | 4/2014 | Weiss et al. |
| 2001/0003099 A1 | 6/2001 | Von Kohorn |
| 2001/0014868 A1 | 8/2001 | Herz et al. |
| 2001/0044751 A1 | 11/2001 | Pugliese, III et al. |
| 2001/0049627 A1 | 12/2001 | Simpson |
| 2002/0002500 A1 | 1/2002 | Takahashi |
| 2002/0019764 A1 | 2/2002 | Mascarenhas |
| 2002/0040321 A1 | 4/2002 | Nicholson |
| 2002/0062249 A1 | 5/2002 | Iannacci |
| 2002/0077892 A1 | 6/2002 | Goring |
| 2002/0082620 A1 | 6/2002 | Lee |
| 2002/0138345 A1 | 9/2002 | Dickson et al. |
| 2002/0169664 A1 | 11/2002 | Walker et al. |
| 2002/0174011 A1 | 11/2002 | Sanchez et al. |
| 2003/0009402 A1 | 1/2003 | Mullen et al. |
| 2003/0018523 A1 | 1/2003 | Rappaport et al. |
| 2003/0093287 A1 | 5/2003 | Lowery |
| 2003/0105689 A1 | 6/2003 | Chandak et al. |
| 2003/0158844 A1 | 8/2003 | Kramer et al. |
| 2003/0195806 A1 | 10/2003 | Willman et al. |
| 2003/0212595 A1 | 11/2003 | Antonucci |
| 2003/0233276 A1 | 12/2003 | Pearlman et al. |
| 2004/0024638 A1 | 2/2004 | Restis |
| 2004/0049452 A1 | 3/2004 | Blagg |
| 2004/0054577 A1 | 3/2004 | Inoue et al. |
| 2004/0056101 A1 | 3/2004 | Barkan et al. |
| 2004/0140361 A1 | 7/2004 | Paul et al. |
| 2005/0096982 A1 | 5/2005 | Morton et al. |
| 2005/0171841 A1 | 8/2005 | Prorock et al. |
| 2005/0171955 A1 | 8/2005 | Hull et al. |
| 2005/0251442 A1 | 11/2005 | Ficalora |
| 2005/0256756 A1 | 11/2005 | Lam et al. |
| 2006/0003749 A1 | 1/2006 | Faisy |
| 2006/0143183 A1 | 6/2006 | Goldberg et al. |
| 2006/0212355 A1 | 9/2006 | Teague et al. |
| 2006/0224451 A1 | 10/2006 | Kerschbrock et al. |
| 2006/0229946 A1 | 10/2006 | Scroggie et al. |
| 2006/0282310 A1 | 12/2006 | Burch |
| 2007/0050258 A1 | 3/2007 | Dohse |
| 2007/0094042 A1 | 4/2007 | Ramer et al. |
| 2007/0094114 A1 | 4/2007 | Bufford et al. |
| 2007/0106536 A1 | 5/2007 | Moore |
| 2007/0118394 A1 | 5/2007 | Cahoon |
| 2007/0121843 A1 | 5/2007 | Atazky et al. |
| 2007/0129998 A1 | 6/2007 | Postrel |
| 2007/0138270 A1 | 6/2007 | Reblin |
| 2007/0162337 A1 | 7/2007 | Hawkins et al. |
| 2007/0174116 A1 | 7/2007 | Keith et al. |
| 2007/0205274 A1 | 9/2007 | Bridges |
| 2007/0250380 A1 | 10/2007 | Mankoff |
| 2007/0288312 A1 | 12/2007 | Wang |
| 2008/0003987 A1 | 1/2008 | Mechaley |
| 2008/0071614 A1 | 3/2008 | Mebruer |
| 2008/0086365 A1 | 4/2008 | Zollino et al. |
| 2008/0097844 A1 | 4/2008 | Hsu et al. |
| 2008/0154714 A1 | 6/2008 | Liu et al. |
| 2008/0195462 A1 | 8/2008 | Magdon-Ismail et al. |
| 2008/0195476 A1 | 8/2008 | Marchese et al. |
| 2008/0228567 A1 | 9/2008 | Williams et al. |
| 2008/0243604 A1 | 10/2008 | Pollard et al. |
| 2009/0030787 A1 | 1/2009 | Pon et al. |
| 2009/0055255 A1 | 2/2009 | Obrea et al. |
| 2009/0063248 A1 | 3/2009 | Chong et al. |
| 2009/0076912 A1 | 3/2009 | Rajan et al. |
| 2009/0319359 A1 | 12/2009 | Soza et al. |
| 2010/0006642 A1 | 1/2010 | Boutcher |
| 2010/0042471 A1 | 2/2010 | Chang et al. |
| 2010/0106598 A1* | 4/2010 | Grimes ............... G06Q 30/02 705/14.53 |
| 2010/0159904 A1 | 6/2010 | Colligan et al. |
| 2010/0293113 A1 | 11/2010 | Munzer et al. |
| 2011/0313829 A1 | 12/2011 | Higgins et al. |
| 2012/0215597 A1* | 8/2012 | Ross ............... G06Q 30/0201 705/14.1 |
| 2013/0006738 A1 | 1/2013 | Horvitz et al. |
| 2013/0297420 A1 | 11/2013 | Roberts et al. |
| 2013/0311282 A1* | 11/2013 | Cochrane, II ........ G06Q 30/02 705/14.53 |
| 2014/0136365 A1 | 5/2014 | Nista |

FOREIGN PATENT DOCUMENTS

| | | | | |
|---|---|---|---|---|
| JP | 2014137757 A | * | 7/2014 | ............. G06F 17/30 |
| WO | WO-01/40980 | | 6/2001 | |
| WO | WO-2004/055701 | | 7/2004 | |
| WO | WO-2005/122020 | | 12/2005 | |

OTHER PUBLICATIONS

Gadd, Ken W, "Business Process Re-Engineering & Management Journal," 1995, 15 pages, v1n3, MCB UP Limited.

Laliberte, "Frame Display Options are Possible", Forum: HyperNews Source, Aug. 13, 1997, 1 page.

Roth, "Get Rich Slowly: Personal Finance that Makes Cents", Mint.com, Nov. 14, 2007, 9 pages [online]. Retrieved on Jan. 3, 2012 from URL: <http://www.getrichslowly.org/blog/2007>.

Trent, "The Simple Dollar," Simple Dollar Online Personal Financial Analysis Tools, Jan. 31, 2008, 4 pages [online]. Retrieved on Jan. 3, 2012 from URL:<http://www.thesimpledollar.com/2008/01/31/online-personal-finance-analysis-tools-some-thoughts-on-quicken-online-mint-and-wesabe/>.

No author provided, "Convergys Corp. Named Frost & Sullivan Award Recipient," Apr. 1, 2002, 4 pages, PR Newswire.

No author provided, "Mint.com Free Personal Finance Web-app is Now Live," Mint.com, Oct. 2007, 8 pages [online], Retrieved from URL: <http://www.stopbuyingcrap.com/online-banking/mintcom-free-personal-finance-web-app-is-now-live/>.

No author provided, "Quicken 2006 Financial Planning Software," Official Quicken Site, 2 pages [online], Retrieved on Mar. 12, 2012 from URL: <http://web.archive.org/web/20051020000622/http://quicken.intuit.com/?>.

Del Favero et al., "Method and System for Providing Sellers Access to Selected Consumers", U.S. Appl. No. 11/875,682, filed Oct. 19, 2007.

Gevelber et al., "Method and System for Finding and Providing Coupons to Consumers", U.S. Appl. No. 11/924,937, filed Oct. 26, 2007.

Weiss et al., "Method and System for Using a Point-of Sale System to Correlate Transactions to a Coupon Database", U.S. Appl. No. 11/925,180, filed Oct. 26, 2007.

Weiss, "Method and System for Competitive Offer Targeting Using a Coupon Database", U.S. Appl. No. 11/930,884, filed Oct. 31, 2007.

Weiss et al., "Method and System for Coupon Distribution Based on Electronic Receipt Data", U.S. Appl. No. 11/963,534, filed Dec. 21, 2007.

Gevelber et al., "Method and System for Providing Relevant Coupons to Consumers Based on Financial Transaction History and Network Search Activity", U.S. Appl. No. 12/016,537, filed Jan. 18, 2008.

Weiss et al., "Method and System for Identifying and Marketing to Groups of Consumers Based on Financial Data", U.S. Appl. No. 12/019,069, filed Jan. 24, 2008.

(56) References Cited

OTHER PUBLICATIONS

Ferrell et al., "Method and System for Providing Consumers Incentive to Re-Distribute Marketing Devices", U.S. Appl. No. 12/107,946, filed Apr. 23, 2008.
Cassanego et al., "Method and System for Providing Dynamic Coupons", U.S. Appl. No. 12/323,846, filed Nov. 26, 2008.
Zackrison et al., "Method and System for Providing Coupon Recommendations", U.S. Appl. No. 12/323,888, filed Nov. 26, 2008.
Dalit, "Method and System for Sharing Marketing Devices", U.S. Appl. No. 12/960,764, filed Dec. 6, 2010.
Roper et al., "Method and System for Sharing Marketing Devices Based on Location Data", U.S. Appl. No. 13/218,144, filed Aug. 25, 2011.
Channakeshava, "Method and System for Providing Purchase Recommendations and Offers that are Within a Consumer's Funding Limits," U.S. Appl. No. 13/755,412, filed Jan. 31, 2013.

* cited by examiner

METHOD AND SYSTEM FOR LINKING SOCIAL MEDIA SYSTEMS AND FINANCIAL MANAGEMENT SYSTEMS TO PROVIDE SOCIAL GROUP-BASED MARKETING PROGRAMS

BACKGROUND

Advertising and marketing often represents a significant on-going expense for merchants, i.e., sellers and/or providers of consumer goods, products, and/or services. Consequently, both merchants and providers of marketing and advertising tools are constantly looking for new ways to provide effective advertising to potential customers, i.e., consumers.

To this end, many merchants offer marketing programs and marketing devices, such as group discounts, coupons, promotional and/or discount certificates, price guarantees, and vouchers, to consumers in an effort to attract and/or encourage business.

Traditionally, marketing programs often used "hard-copy" marketing devices, such as coupons, typically in printed, form, that were distributed by various means, including, but not limited to: by mail; in newspapers; in magazines; in flyers and inserts; at store fronts and/or product displays; and/or as attachments to store receipts (i.e., printed on the back of a receipt or appended to a receipt).

More recently, marketing programs have used marketing devices in the form of "electronic media based marketing devices" using electronic means such as, but not limited to: networks of computing systems, including public networks such as the Internet; mobile networks and computing systems, such as smart phones; various advertising/coupon web-sites; e-mail; electronic coupon attachments to electronic receipts; and electronic coupon attachments to transactional data, such as, but not limited to transactional data from, and/or displayed by, banks, credit card companies, and other financial institutions.

In addition, even more recently, "mobile coupons" have become increasingly popular. Using mobile coupons, a marketing device is provided that is a type of electronic media based marketing device made available to, and/or delivered to, a consumer via a display device on one or more mobile computing systems, or other mobile devices. In many instances, once a mobile coupon is made available, or delivered, to the consumer via the display device, the mobile coupon is also presented to a seller of products and/or services, and/or is used, by displaying the mobile coupon to a merchant via the display device on the one or more mobile computing systems, or other mobile devices, or by another form of data transfer.

In other cases, marketing programs include recurring purchase-based programs whereby a consumer who makes a defined number of purchases, or spends a threshold amount of money, is provided a discount or other marketing program benefit.

Many marketing programs offer significant discounts to the consumer meeting the terms/requirements of the marketing program. Therefore, the marketing program can represent a significant expense to the merchant. Typically, the merchant is willing to incur this expense to meet specific goals, including, but not limited to: to help build up a customer base; to get consumers into a store; to retain customers who find a lower price for an item from a competitor; to lure customers away from a competitor; and/or to help clear excess inventory and/or to boost sales of a given product. In addition, many merchants desire not only to attract new and returning consumers but they also want to encourage consumers to spend more on their products and services.

In order to most efficiently use their marketing and/or advertising resources, merchants typically want to ensure their marketing programs, and marketing program benefits, are offered to, and/or distributed to, "high value potential customers", i.e., consumers who are most likely to be motivated by the marketing device to make a purchase of a given product and/or service, and to become a "regular" or repeat customer.

However, currently, many marketing programs are offered to consumers who do not have the potential to become regular customers, i.e., are not "high value potential customers". This is because, currently, merchants have little or no information regarding the spending habits of the consumers who are provided access to, and/or or invited to participate in, the marketing programs.

In addition, it often happens that a marketing program is offered to a consumer, and that consumer has one or more social contacts, i.e., associates/friends who are socially connected to the consumer, who would be interested in the marketing program and/or are "high value potential customers" who would be very interested in the given marketing program. However, in many cases, the consumer is either not aware that their socially connected associates/friends are high value potential customers of a given merchant who would be interested in the marketing program, or the consumer is not particularly motivated to make their high value potential customer associates/friends aware of the marketing program. This is largely because current processes/methods for informing socially connected associates/friends of a marketing program are far too burdensome for the consumer, rely far too much on the consumer's memory and ability to identify potentially interested socially connected associates/friends, and are far too subject to human error and chance.

Theoretically, social media systems, such as Twitter™, Facebook™, MySpace™, Linkedin™, etc., offer merchants a powerful mechanism for relaying information about their businesses, and/or products and services, and/or for providing marketing programs and offers. However, currently, it is difficult to identify high value potential customers and/or consumers who are customers of a given merchant, and/or consumers of a specified product or service, who are active, or have a presence, on one or more social media systems. In addition, even when customers of a given merchant, and/or consumers of a specified product or service, who are active, or have a presence, on one or more social media systems are identified, it is an even more difficult problem to motivate those identified consumers to share information indicating they are taking part in a marketing program, and/or have made a purchase from a specified merchant, and/or of a specified product or service, with their social connections or on a social media system.

This is again a result of the fact that, in many cases, the consumer is either not aware that their socially connected associates/friends are high value potential customers of a given merchant who would be interested in the marketing program, or the consumer is not particularly motivated to make their high value potential customer associates/friends aware of the marketing program.

As a result of the situation described above, marketing programs are currently offered to consumers who are unknowns, and are often not identifiable as high value potential customers. In addition, even when a consumer is identified as a high value potential customer, or existing customer, opportunities to access socially connected associates/friends of the consumer that are also high value potential customers are missed.

What is needed, is a method and system for identifying groups of socially connected consumers who are also high value potential customers; making the socially connected consumers aware of, and offering the socially connected consumers the opportunity take part in, a social group-based marketing program relevant to a common interest or spending pattern of the socially connected consumers; and then motivating the socially connected consumers to take part in the social group-based marketing program.

SUMMARY

In accordance with one embodiment, a method and system for linking social media systems and financial management systems to provide social group-based marketing programs includes a process for linking social media systems and financial management systems to provide social group-based marketing programs whereby, in one embodiment, marketing program data associated with a social group-based marketing program offered by a merchant is obtained. In one embodiment, the marketing program data includes marketing program eligibility criteria data indicating marketing program eligibility criteria that must be met before consumers are eligible to register to take part in the marketing program. In one embodiment, the marketing program data includes marketing program requirements data that must be met in order for identified eligible consumers to receive the benefits of the social group-based marketing program.

In one embodiment, access to social group identification data identifying two or more socially connected consumers is obtained from a social media system and financial data associated with the two or more socially connected consumers identified in the social group identification data is obtained. In one embodiment, the financial data associated with the two or more socially connected consumers is analyzed to identify two or more spending and socially connected consumers whose financial data includes similar spending transactions in one or more financial categories.

In one embodiment, the financial data associated with the two or more spending and socially connected consumers and the marketing program eligibility criteria data are compared and if the financial data associated with the two or more spending and socially connected consumers matches the marketing program eligibility criteria data, the two or more spending and socially connected consumers are designated marketing program eligible spending and socially connected consumers.

In one embodiment, the identified marketing program eligible spending and socially connected consumers are invited to register for the social group-based marketing program and the program eligible spending and socially connected consumers responding to the invitation and providing registration data are designated registered marketing program eligible spending and socially connected consumers. In one embodiment, the spending data associated with the registered marketing program eligible spending and socially connected consumers is obtained and/or monitored and compared with the marketing program requirements data. In one embodiment, when the spending data associated with the registered marketing program eligible spending and socially connected consumers indicates the marketing program requirements of the marketing program requirements data have been met, the registered marketing program eligible spending and socially connected consumers are provided the benefits of the social group-based marketing program.

Figure 1:
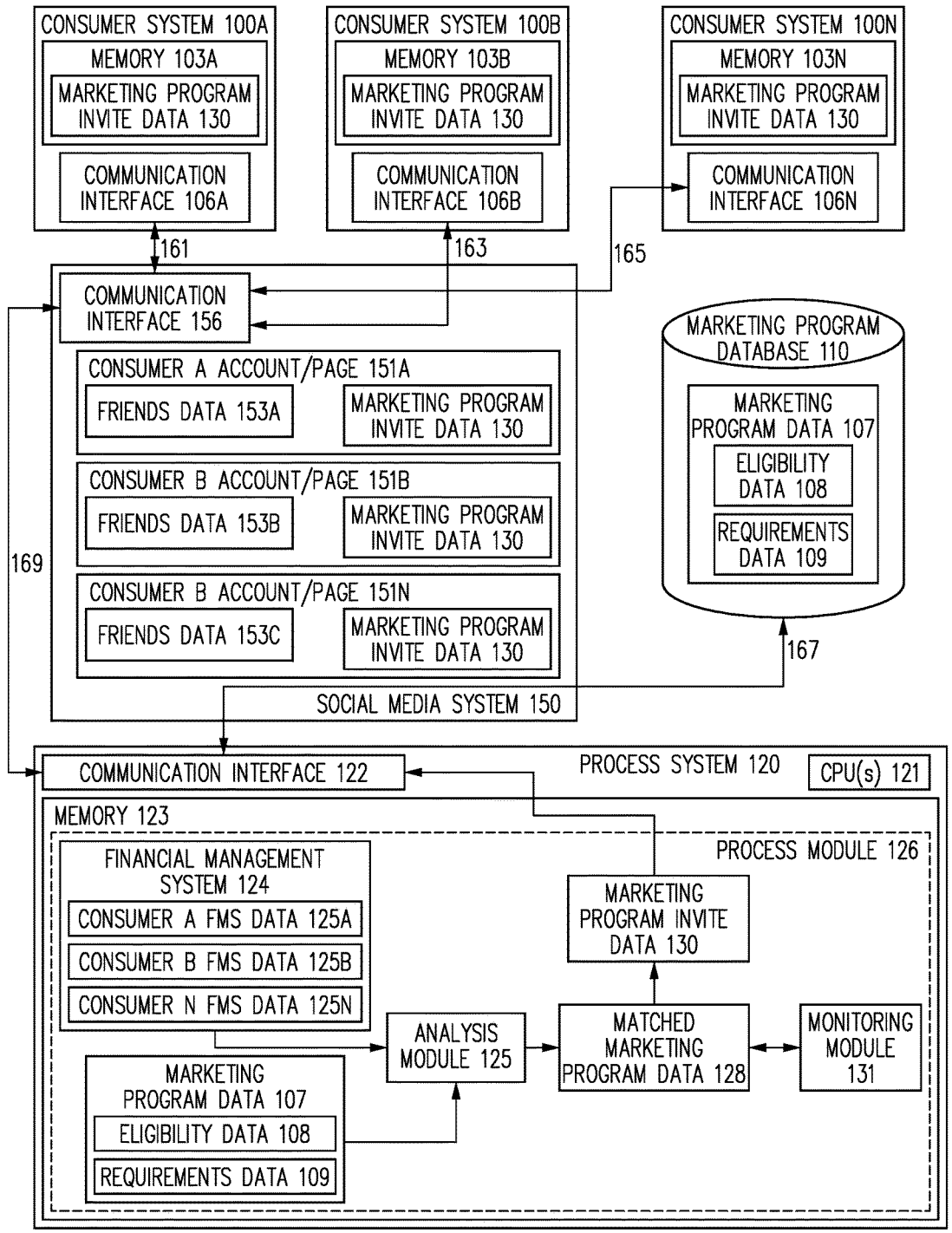
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIGS., and/or described below.

In one embodiment, a process for linking social media systems and financial management systems to provide social group-based marketing programs includes one or more applications, such as software packages, modules, or systems, implemented on one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, a method and system for linking social media systems and financial management systems to provide social group-based marketing programs includes a process for linking social media systems and financial management systems to provide social group-based marketing programs whereby, in one embodiment, marketing program data associated with a social group-based marketing program offered by a merchant is obtained.

In one embodiment, the marketing program data includes data indicating the benefits available through/associated with the social group-based marketing program. In various embodiments, the benefits available through/associated with the social group-based marketing program include a refund of the purchase price paid to the merchant by each of socially connected consumers who are eligible for, register with, and meet the requirements of, the social group-based marketing program.

In one embodiment, the refund of the purchase price is provided to the socially connected consumers who are eligible for, register with, and meet the requirements of, the social group-based marketing program, by refund transactions to credit or debit cards used by the socially connected consumers to pay the merchant. In other embodiments, the refund of the purchase price is provided to the socially connected consumers who are eligible for, register with, and meet the requirements of, the social group-based marketing program, via check, and/or voucher, and/or coupon, and/or any other marketing device.

Herein, the terms "coupon" and "marketing device" are used interchangeable to include traditional and/or electronic media based marketing devices, mobile coupons/marketing devices, virtual coupons/marketing devices offered as screen displays on computing systems, promotional certificates, vouchers, discount certificates, discount vouchers, sales offers, advertisements, and/or any other marketing tool and/or device, distributed by any distribution means, as discussed herein, and/or as known in the art at the time of filing, and/or as developed after the time of filing.

In one embodiment, the refund of the purchase price is provided to the socially connected consumers who are eligible for, register with, and meet the requirements of, the social group-based marketing program, by providing a store credit with the merchant for use in making future purchases.

In other embodiments, the refund of the purchase price is provided to the socially connected consumers who are eligible for, register with, and meet the requirements of, the social group-based marketing program, via any means for providing a refund as discussed herein, and/or as known in the art at the time of filing, and/or as developed after the time of filing.

In various embodiments, the benefits available through/associated with the social group-based marketing program include a discount provided to each of the socially connected consumers who are eligible for, register with, and meet the requirements of, the social group-based marketing program on future purchases from the merchant.

In various embodiments, the discount is provided to each of the socially connected consumers who are eligible for, register with, and meet the requirements of, the social group-based marketing program on future purchases from the merchant via voucher, and/or coupon, and/or any other marketing device, as discussed herein, and/or as known in the art at the time of filing, and/or as developed after the time of filing.

In other embodiments, the discount is provided to each of the socially connected consumers who are eligible for, register with, and meet the requirements of, the social group-based marketing program on future purchases from the merchant via any means for providing a discount on future purchases, as discussed herein, and/or as known in the art at the time of filing, and/or as developed after the time of filing.

In various embodiments, the benefits available through/associated with the social group-based marketing program include a refund of the purchase price paid to the merchant by each of the socially connected consumers who are eligible for, register with, and meet the requirements of, the social group-based marketing program for defined products and/or services purchased.

In one embodiment, the refund is provided to the socially connected consumers who are eligible for, register with, and meet the requirements of, the social group-based marketing program, by refund transactions to credit or debit cards used by the socially connected consumers to pay the merchant. In other embodiments, the refund is provided to the socially connected consumers who are eligible for, register with, and meet the requirements of, the social group-based marketing program, via check, and/or voucher, and/or coupon, and/or any other marketing device.

In one embodiment, the refund is provided to the socially connected consumers who are eligible for, register with, and meet the requirements of, the social group-based marketing program, by providing a store credit with the merchant for use in making future purchases.

In other embodiments, the refund is provided to the socially connected consumers who are eligible for, register with, and meet the requirements of, the social group-based marketing program, via any means for providing a refund as discussed herein, and/or as known in the art at the time of filing, and/or as developed after the time of filing.

In various embodiments, the benefits available through/associated with the social group-based marketing program include a discount provided to each of the socially connected consumers who are eligible for, register with, and meet the requirements of, the social group-based marketing program on future purchases from the merchant of defined products and/or services.

In one embodiment, the discount is provided to each of the socially connected consumers who are eligible for, register with, and meet the requirements of, the social group-based marketing program on future purchases from the merchant via voucher, and/or coupon, and/or any other marketing device, as discussed herein, and/or as known in the art at the time of filing, and/or as developed after the time of filing.

In other embodiments, the discount is provided to each of the socially connected consumers who are eligible for, register with, and meet the requirements of, the social group-based marketing program on future purchases from the merchant via any means for providing a discount on future purchases, as discussed herein, and/or as known in the art at the time of filing, and/or as developed after the time of filing.

In various embodiments, the benefits available through/associated with the social group-based marketing program include any benefit, or combination benefits, defined by the merchant, as discussed herein, and/or as known in the art at the time of filing, and/or as developed after the time of filing.

In one embodiment, the marketing program data includes marketing program eligibility criteria data indicating marketing program eligibility criteria that must be met before consumers are eligible to register to take part in the marketing program.

In one embodiment, using the marketing program eligibility criteria data a merchant can ensure that the marketing program, and marketing program benefits, is/are offered to consumers who are "high value potential customers", i.e., consumers who are most likely to be motivated by the marketing device to make a purchase of a given product and/or service, and to become a "regular" or repeat customer.

In one embodiment, the marketing program data includes marketing program eligibility criteria data indicating the marketing program eligibility criterion that the group of consumers must have historically spent a threshold amount of money individually with one or more identified product and/or service providers other than the merchant. In one embodiment, this marketing program eligibility criterion ensures that the group of consumers have historically, and individually, been threshold level purchasers of products and/or services offered by the merchant, and that, through the social group-based marketing program, the merchant may actually be drawing customers away from a competitor.

In one embodiment, the marketing program data includes marketing program eligibility criteria data indicating the marketing program eligibility criterion that the group of consumers must have historically spent a threshold amount of money collectively with one or more identified product and/or service providers other than the merchant. In one embodiment, this marketing program eligibility criterion ensures that the group of consumers have historically, and collectively, been threshold level purchasers of products and/or services offered by the merchant, and that, through the social group-based marketing program, the merchant may actually be drawing customers away from a competitor.

In one embodiment, the marketing program data includes marketing program eligibility criteria data indicating the marketing program eligibility criterion that the group of consumers must have historically spent a defined threshold amount of money individually in a defined financial category. In one embodiment, this marketing program eligibility criterion ensures that the group of consumers have historically, and individually, been threshold level purchasers in a financial category associated with products and/or services offered by the merchant.

In one embodiment, the marketing program data includes marketing program eligibility criteria data indicating the marketing program eligibility criterion that the group of consumers must have historically spent a defined threshold amount of money collectively in a defined financial category. In one embodiment, this marketing program eligibility criterion ensures that the group of consumers have historically, and collectively, been threshold level purchasers in a financial category associated with products and/or services offered by the merchant.

In one embodiment, the marketing program data includes marketing program eligibility criteria data indicating the marketing program eligibility criterion that the group of consumers must individually have a defined threshold income and/or discretionary spending budget. In one embodiment, this marketing program eligibility criterion ensures the consumers individually have an income level, and/or a spending capability, desired by the merchant.

In one embodiment, the marketing program data includes marketing program eligibility criteria data indicating the marketing program eligibility criterion that the group of consumers must collective have a defined threshold income and/or discretionary spending budget. In one embodiment, this marketing program eligibility criterion ensures the consumers collectively have an income level, and/or a spending capability, desired by the merchant.

In one embodiment, the marketing program data includes marketing program eligibility criteria data indicating the marketing program eligibility criterion that the group of consumers must individually meet defined demographics. In one embodiment, this marketing program eligibility criterion ensures the consumers individually have characteristics, such a home address zip code, or age group, or marital status desired by the merchant.

In one embodiment, the marketing program data includes marketing program eligibility criteria data indicating the marketing program eligibility criterion that the group of consumers must collectively meet defined demographics. In one embodiment, this marketing program eligibility criterion ensures the consumers collectively have characteristics, such a home address zip code, or age group, or marital status desired by the merchant.

In one embodiment, the marketing program data includes marketing program eligibility criteria data indicating any of the marketing program eligibility criterion, or combination of marketing program eligibility criteria, desired by the merchant, and/or as discussed herein, and/or as known in the art at the time of filing, and/or as developed after the time of filing.

In one embodiment, the marketing program data includes marketing program requirements data that must be met in order for consumers to receive the benefits of the social group-based marketing program.

In one embodiment, the marketing program requirements data includes data indicating the marketing program requirement that the group of consumers must individually spend a defined threshold amount of money with the merchant in a defined timeframe in order to receive the benefits of the social group-based marketing program.

In one embodiment, the marketing program requirements data includes data indicating the marketing program requirement that the group of consumers must collectively spend a defined threshold amount of money with the merchant in a defined timeframe in order for the consumers to receive the benefits of the social group-based marketing program.

In one embodiment, the marketing program requirements data includes data indicating the marketing program requirement that the group of consumers must individually spend a defined threshold amount of money on defined products and/or services from the merchant in a defined timeframe in order for the consumers to receive the benefits of the social group-based marketing program.

In one embodiment, the marketing program requirements data includes data indicating the marketing program requirement that the group of consumers must collectively spend a defined threshold amount of money on defined products and/or services from the merchant in a defined timeframe in order for the consumers to receive the benefits of the social group-based marketing program.

In one embodiment, the marketing program requirements data includes data indicating the marketing program requirement that the group of consumers must individually make a threshold number of purchases from the merchant in a defined timeframe in order for the consumers to receive the benefits of the social group-based marketing program.

In one embodiment, the marketing program requirements data includes data indicating the marketing program requirement that the group of consumers must collectively make a threshold number of purchases from the merchant in a defined timeframe in order for the consumers to receive the benefits of the social group-based marketing program.

In one embodiment, the marketing program data includes the marketing program requirements data indicating any of the marketing program requirements, or combination of the marketing program requirements, desired by the merchant, and/or as discussed herein, and/or as known in the art at the time of filing, and/or as developed after the time of filing.

In one embodiment, marketing program data associated with multiple social group-based marketing programs, and/or offered by multiple merchants, is obtained and the marketing program data is organized according to the merchant offering the social group-based marketing programs, the marketing program eligibility criteria data associated with the social group-based marketing programs, and/or the marketing program requirements data associated with the social group-based marketing programs. In one embodiment, the organized marketing program data associated with multiple social group-based marketing programs, and/or offered by multiple merchants, is then stored in a marketing program database or other data store.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to an on-line function. Herein, the term "database" can refer to any data storage means that is part of, or under the control of, any computing system, as discussed herein, known at the time of filing, or as developed thereafter.

In one embodiment, access to social group identification data identifying two or more socially connected consumers is obtained from a social media system.

Currently available social media systems provide accounts, or a presence, for a consumer where the consumer can post entries, typically text entries of a defined size. The consumer's entries are then made viewable, e.g., are "broadcast" or "posted" to other consumers/users socially connected to the posting consumer, who link to the consumer's account/page and/or otherwise indicate they wish to see, and be informed of, the consumer's posted entries.

One important feature of currently available social media systems is that social contacts, i.e., friends and associates, of a consumer are linked to/displayed in the consumer's page or presence on the social media system. In short, a feature of many social media systems is that a listing of social contacts associated with a consumer is provided through the social media system along with contact information for those social contacts.

Examples of currently available social media systems include, but are not limited to, Facebook™, MySpace™, Linkedin™, and Twitter™.

In one embodiment, access to a social media account associated with the consumer is obtained from the consumer. In one embodiment, once access is provided to the social media account associated with the consumer, the list of social contacts associated with the consumer is accessed and data identifying two or more socially connected consumers associated with the consumer is obtained. In this way, relatively accurate data indicating two or more socially connected consumers is obtained.

In various embodiments, access to social group identification data identifying the two or more socially connected consumers is obtained from any source of data identifying two or more socially connected consumers, as discussed herein, and/or as known in the art at the time of filing, and/or as made available after the time of filing.

In one embodiment, once two or more socially connected consumers, including the original consumer, are identified, financial data associated with the two or more socially connected consumers is obtained.

In one embodiment, the financial transaction data includes data indicating purchases made by the two or more socially connected consumers using one or more financial accounts associated the two or more socially connected consumers.

In one embodiment, the two or more socially connected consumers, including the original consumer, all use a common financial management system. In one embodiment, the financial transaction data is obtained through the common financial management system, such as a financial transaction management system, that implements, includes, is accessible by, and/or is otherwise associated with, the process for linking social media systems and financial management systems to provide social group-based marketing programs, and/or the two or more socially connected consumers.

Examples of currently available types of financial management systems include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

Current financial management systems are typically software applications which, along with a parent computing system or device, help consumers/users manage their finances by providing a centralized interface with multiple financial accounts provided through banks, and/or credit card companies, and/or asset account providers, and/or mortgage companies, and/or retirement account providers, and/or other various financial and asset management institutions and/or accounts, for identifying, processing, storing, and categorizing user financial transactions conducted using the financial accounts. Currently, financial management systems typically obtain most, if not all, of the consumer's financial and/or transactional data from multiple financial accounts as well as a significant amount of the consumer's demographic and personal data.

Currently, financial management systems also typically obtain highly detailed financial transaction data from all, or most, financial accounts used by the consumer, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification, Web Direct, screen-scrapping technology, and/or various systems for transferring financial transaction data.

Using financial management systems, the financial transaction data such as payee identification, payee location, payment amount, date of the transaction, various tags and/or labels, and other data is obtained and is often used by the financial management system to process, categorize and/or tag individual financial transactions as a particular type of income or expense, to generate various financial reports, and to create an overview of the individual consumer's financial situation based on input from multiple, and often all, available sources of financial information regarding a given consumer, e.g., from multiple financial accounts associated with each consumer. Some currently offered financial management systems then use this financial transaction data to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, the financial data associated with the two or more socially connected consumers is analyzed and compared to identify two or more spending and socially connected consumers whose financial data includes similar spending transactions in one or more financial categories.

In one embodiment, the two or more spending and socially connected consumers are identified based on their having financial transaction data indicating spending transactions categorized by the financial management system in the same, or similar, financial category. As a specific illustrative example, in one embodiment, the two or more spending and socially connected consumers are identified based on their having transaction data indicating spending transactions categorized by the financial management system as "dining out", and/or "entertainment".

In one embodiment, the two or more spending and socially connected consumers are identified based on their having financial transaction data indicating spending transactions categorized by the financial management system in the same, or similar, financial category and conducted in the same geographic area. As a specific illustrative example, in one embodiment, the two or more spending and socially connected consumers are identified based on their having transaction data indicating spending transactions categorized by the financial management system as "dining out", and/or "entertainment" and taking place in the same city, or ZIP Code.

In one embodiment, the two or more spending and socially connected consumers are identified based on their having financial transaction data indicating spending transactions categorized by the financial management system in the same, or similar, financial category and conducted in the same timeframe. As a specific illustrative example, in one embodiment, the two or more spending and socially connected consumers are identified based on their having transaction data indicating spending transactions categorized by the financial management system as "dining out", and/or "entertainment" and taking place within the same month, and/or on the same day of the week, such as on a weekend day.

In one embodiment, the two or more spending and socially connected consumers are identified based on their having financial transaction data indicating spending transactions categorized by the financial management system in the same, or similar, financial category and indicating a similar cumulative spending amount in the financial category in a defined timeframe. As a specific illustrative example, in one embodiment, the two or more spending and socially connected consumers are identified based on their having transaction data indicating spending transactions categorized by the financial management system as "dining out", and/or "entertainment" and totaling approximately $300 per month.

In one embodiment, the two or more spending and socially connected consumers are identified based on their having financial transaction data indicating spending transactions conducted with similar merchants, i.e., having similar payees. As a specific illustrative example, in one embodiment, the two or more spending and socially connected consumers are identified based on their having transaction data indicating spending transactions having payees which are Italian restaurants.

In one embodiment, the two or more spending and socially connected consumers are identified based on their having financial transaction data indicating spending transactions conducted with the same merchants, i.e., having the same payees. As a specific illustrative example, in one embodiment, the two or more spending and socially connected consumers are identified based on their having transaction data indicating spending transactions having a payee which is a specific Italian restaurant, or restaurant chain.

In one embodiment, the two or more spending and socially connected consumers are identified based on their having financial transaction data indicating any similar spending habits of interest to the merchant and/or as discussed herein, and/or as known in the art at the time of filing, and/or as becomes known after the time of filing.

In one embodiment, once two or more spending and socially connected consumers are identified, the financial data associated with the two or more spending and socially connected consumers and the marketing program eligibility criteria data are compared.

In one embodiment, if the financial data associated with the two or more spending and socially connected consumers matches the marketing program eligibility criteria data, i.e., indicates the two or more spending and socially connected consumers meet the eligibility criteria indicated in the marketing program eligibility criteria data, data indicating the designation of the two or more spending and socially connected consumers is transformed to indicate a designation of marketing program eligible spending and socially connected consumers.

In one embodiment, the identified marketing program eligible spending and socially connected consumers are then invited to register for the social group-based marketing program.

In one embodiment, the marketing program eligible spending and socially connected consumers are informed of the social group-based marketing program they are eligible for, and invited to register with the social group-based marketing program, through the social media system.

In one embodiment, the marketing program eligible spending and socially connected consumers are informed of the social group-based marketing program they are eligible for, and invited to register with the social group-based marketing program, via any mechanism for informing the marketing program eligible spending and socially connected consumers of the social group-based marketing program, and inviting them to register, such as, but not limited to, email, voicemail, text message, phone message and POTS, and/or any other means or mechanism for contacting the marketing program eligible spending and socially connected consumers, as discussed herein, and/or as known in the art at the time of filing, and/or as developed/made available after the time of filing.

In one embodiment, data indicating the designation of all of the marketing program eligible spending and socially connected consumers who respond to the invitation and register with the socially group-based marketing program is transformed to data designating the marketing program eligible spending and socially connected consumers who respond to the invitation and register with the socially group-based marketing program as registered marketing program eligible spending and socially connected consumers.

In one embodiment, once the registered marketing program eligible spending and socially connected consumers are identified, spending data associated with the registered marketing program eligible spending and socially connected consumers is obtained and/or monitored.

In one embodiment, spending data associated with the registered marketing program eligible spending and socially connected consumers is obtained and/or monitored by monitoring purchase transactions conducted with the merchant offering the social group-based marketing program. In this embodiment, the spending data associated with each of the registered marketing program eligible spending and socially connected consumers is obtained, analyzed, tracked, and stored via a computing system associated with the merchant, and/or the process for linking social media systems and financial management systems to provide social group-based marketing programs.

In one embodiment, spending data associated with the registered marketing program eligible spending and socially connected consumers is obtained and/or monitored by, and/or through, the financial management system whereby the purchase transactions conducted with the merchant offering the social group-based marketing program are identified. In this embodiment, the spending data associated with each of the registered marketing program eligible spending and socially connected consumers is obtained, analyzed, tracked, and stored via the financial management system, and/or the process for linking social media systems and financial management systems to provide social group-based marketing programs.

In one embodiment, as changes in the spending data associated with the registered marketing program eligible spending and socially connected consumers are identified, the spending data associated with the registered marketing program eligible spending and socially connected consumers is compared with the marketing program requirements data.

In one embodiment, when the spending data associated with the registered marketing program eligible spending and socially connected consumers indicates the marketing program requirements of the marketing program requirements data have been met, the registered marketing program eligible spending and socially connected consumers are provided the benefits of the social group-based marketing program.

As a specific illustrative example, in one embodiment, it is stipulated that the marketing program requirements of the marketing program requirements data include the requirement that each of the registered marketing program eligible spending and socially connected consumers individually spends $30 with the merchant within two months of registering with the social group-based marketing program.

In this specific illustrative example, once the registered marketing program eligible spending and socially connected consumers are identified, the spending data associated with the registered marketing program eligible spending and socially connected consumers is monitored through the financial management system common to these parties and once it is determined that each of the registered marketing program eligible spending and socially connected consumers has spent at least $30 with the merchant within two months of registering with the social group-based marketing program, each of the registered marketing program eligible spending and socially connected consumers is provided the benefits stipulated in the marketing program data associated with the social group-based marketing program.

Using the method and system for linking social media systems and financial management systems to provide social group-based marketing programs, as discussed herein, high value potential customers are identified based on an analysis of their actual financial transaction data obtained from a financial management system. In addition, groups of socially connected consumers are also identified by leveraging the features of currently available social media systems.

Consequently, using the method and system for linking social media systems and financial management systems to provide social group-based marketing programs, as discussed herein, groups of socially connected consumers who are also high value potential customers are reliably identified and the socially connected consumers are efficiently made aware of, and offered the opportunity take part in, a social group-based marketing program relevant to a common interest or spending pattern of the socially connected consumers, as identified based on actual financial transaction data associated with the socially connected consumers. Then, using the method and system for linking social media systems and financial management systems to provide social group-based marketing programs, as discussed herein, the socially connected consumers are motivated to take part in the social group-based marketing program by offering the benefits of the group-based marketing program to all of the socially connected consumers only if each of the socially connected consumers performs their portion of the social group-based marketing program requirements. Consequently, using the method and system for linking social media systems and financial management systems to provide social group-based marketing programs, as discussed herein, gentle, but effective, peer pressure is used to motivate each of the socially connected consumers to actively participate in the social group-based marketing program.

Hardware Architecture

FIG. 1 is a block diagram of an exemplary hardware architecture for implementing one embodiment of a system and method for linking social media systems and financial management systems to provide social group-based marketing programs, such as exemplary process 200 discussed herein, that includes: consumer systems 100A, 100B through 100N, e.g., "N" computing systems associated with "N" identified registered marketing program eligible spending and socially connected consumers, where "N" is greater than one; social media system 150, e.g., any social media system as discussed herein; marketing program database 110, e.g., any database or data store, as discussed herein including marketing program data; and process system 120, e.g., a computing system providing a financial management system and/or implementing at least part of a process for linking social media systems and financial management systems to provide social group-based marketing programs; all operatively coupled by communications channels 161, 163, 165, 167, and 169.

As seen in FIG. 1, consumer systems 100A, 100B through 100N, include respective memories 103A, 103B, through 103N and communications interfaces 106A, 106B, through 106N. As also seen in FIG. 1, memories 103A, 103B, through 103N include marketing program invite data 130 as received from process system 120 and/or social media system 150. In various embodiments, consumer systems 100A, 100B through 100N, can be any computing systems as discussed herein, and/or as known in the art at the time of filing, and/or as developed after the time of filing.

As seen in FIG. 1, marketing program database 110 includes marketing program data 107 including eligibility data 108 and requirements data 109. In various embodiments, marketing program database 110 can be any database/data store as discussed herein, and/or as known in the art at the time of filing, and/or as developed after the time of filing.

As seen in FIG. 1, process system 120 includes CPUs 121, memory 123, and communications interface 122. As also seen in FIG. 1, memory 123 includes process module 126 with financial management system 124, including consumer financial data associated with the "N" consumers, represented by consumer A FMS data 125A, consumer B FMS data 125B, and consumer N FMS data 125N in FIG. 1. In one embodiment process module 126 includes marketing program data 107 as received from marketing program database 110, via communications channel 167 and communications interface 122, analysis module 125, matched marketing program data 128, marketing program invite data 130 and monitoring module 131. In various embodiments, process system 120 can be any computing system as discussed herein, and/or as known in the art at the time of filing, and/or as developed after the time of filing.

As seen in FIG. 1, social media system 150 includes consumer A account/page 151A including friends data 153A and marketing program invite data 130, consumer B account/page 151B including friends data 153B and marketing program invite data 130, and consumer N account/page 151N including friends data 153N and marketing program invite data 130, as well as communications interface 156. In various embodiments, social media system 150 is in communication with process system 120 via communications interface 156, communications channel 169, and communications interface 122. In various embodiments, social media system 150 can be any computing system as discussed herein, and/or as known in the art at the time of filing, and/or as developed after the time of filing, capable of implementing any social networking site, as discussed herein, and/or as known in the art at the time of filing, and/or as developed after the time of filing.

In various embodiments, one or more of communication channels 161, 163, 165, 167, and 169 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In accordance with one embodiment, marketing program data 107 associated with a social group-based marketing program offered by a merchant is obtained.

In one embodiment, the marketing program data 107 includes data indicating the benefits available through/associated with the social group-based marketing program of marketing program data 107 (not shown).

In one embodiment, marketing program data 107 includes marketing program eligibility criteria data, shown as eligibility data 108 in FIG. 1 indicating marketing program eligibility criteria that must be met before consumers are eligible to register to take part in the social group-based marketing program of marketing program data 107.

In one embodiment, marketing program data 107 includes marketing program requirements data, shown as requirements data 109 in FIG. 1 that indicates one or more marketing program requirements that must be met in order for consumers to receive the benefits of the social group-based marketing program of marketing program data 107.

In one embodiment, marketing program data, such as marketing program data 107, associated with multiple social group-based marketing programs, and/or offered by multiple merchants, is obtained and the marketing program data is organized according to the merchant offering the social group-based marketing programs, the marketing program eligibility criteria data associated with the social group-based marketing programs, and/or the marketing program requirements data associated with the social group-based marketing programs. In one embodiment, the organized marketing program data associated with multiple social group-based marketing programs, and/or offered by multiple merchants, is then stored in marketing program database 110 or another data store.

In one embodiment, access to social group identification data, such as consumer A account/page 151A including friends data 153A, consumer B account/page 151B including friends data 153B, and consumer N account/page 151N including friends data 153N, identifying two or more socially connected consumers is obtained from a social media system, such as social media system 150.

Currently available social media systems provide accounts, or a presence, such consumer A account/page 151A including friends data 153A, consumer B account/page 151B including friends data 153B, and consumer N account/page 151N including friends data 153N, for a consumer where the consumer can post entries, typically text entries of a defined size. The consumer's entries are then made viewable, e.g., are "broadcast" or "posted" to other consumers/users socially connected to the posting consumer, who link to the consumer's account/page and/or otherwise indicate they wish to see, and be informed of, the consumer's posted entries.

One important feature of currently available social media systems is that social contacts, i.e., friends and associates, of a consumer are linked to/displayed in the consumer's page or presence on the social media system such as consumer A account/page 151A including friends data 153A, consumer B account/page 151B including friends data 153B, and consumer N account/page 151N including friends data 153N. In short, a feature of many social media systems is that a listing of social contacts associated with a consumer is provided through the social media system along with contact information for those social contacts.

Examples of currently available social media systems include, but are not limited to, Facebook™, MySpace™, Linkedin™, and Twitter™.

In one embodiment, once two or more socially connected consumers are identified, financial data, represented by consumer A FMS data 125A, consumer B FMS data 125B, and consumer N FMS data 125N in FIG. 1, associated with the two or more socially connected consumers is obtained.

In one embodiment, the financial transaction data includes data indicating purchases made by the two or more socially connected consumers using one or more financial accounts associated the two or more socially connected consumers.

In one embodiment, the two or more socially connected consumers all use a common financial management system, e.g., financial management system 124 in FIG. 1. In one embodiment, the financial transaction data is obtained through the common financial management system, such as financial management system 124, that implements, includes, is accessible by, and/or is otherwise associated with, the process for linking social media systems and financial management systems to provide social group-based marketing programs, and/or the two or more socially connected consumers.

In one embodiment, the financial data associated with the two or more socially connected consumers, e.g., consumer A FMS data 125A, consumer B FMS data 125B, and consumer N FMS data 125N, is analyzed and compared at analysis module 125 to identify two or more spending and socially connected consumers whose financial data includes similar spending transactions in one or more financial categories.

In one embodiment, once two or more spending and socially connected consumers are identified at analysis module 125, the financial data associated with the two or more spending and socially connected consumers and eligibility data 108 are compared at analysis module 125.

In one embodiment, if the financial data associated with the two or more spending and socially connected consumers matches eligibility data 108, i.e., indicates the two or more spending and socially connected consumers meet the eligibility criteria indicated in eligibility data 108, data indicating the designation of the two or more spending and socially connected consumers is transformed by analysis module 125 to indicate a designation of marketing program eligible spending and socially connected consumers.

In one embodiment, matched marketing program data 128 is generated indicating the marketing program eligible spending and socially connected consumers are eligible to participate in the social group-based marketing program of marketing program data 107 and, in one embodiment, the identified marketing program eligible spending and socially connected consumers are then invited to register for the social group-based marketing program represented by marketing program data 107 via marketing program invite data 130 generated by analysis module 125.

In one embodiment, the marketing program eligible spending and socially connected consumers are informed of the social group-based marketing program of marketing program data 107 they are eligible for, and are invited to register with the social group-based marketing program, through social media system 150 via consumer A account/page 151A including marketing program invite data 130, consumer B account/page 151B including marketing program invite data 130, and consumer N account/page 151N including marketing program invite data 130. In one embodiment, marketing program invite data 130 is transferred from consumer A account/page 151A to consumer system 100A, and from consumer B account/page 151B to consumer system 100B, and from consumer N account/page 151N to consumer system 100N.

In one embodiment, data indicating the designation of all of the marketing program eligible spending and socially connected consumers who respond to the invitation of marketing program invite data 130 and register with the socially group-based marketing program of marketing program data 107 is transformed by analysis module 125 to data designating the marketing program eligible spending and socially connected consumers who respond to the invitation and register with the socially group-based marketing program as registered marketing program eligible spending and socially connected consumers.

In one embodiment, once the registered marketing program eligible spending and socially connected consumers are identified, spending data, such as consumer A FMS data 125A, consumer B FMS data 125B, and consumer N FMS data 125N, associated with the registered marketing program eligible spending and socially connected consumers is obtained and/or monitored.

In one embodiment, as changes in the spending data associated with the registered marketing program eligible spending and socially connected consumers are identified, the spending data associated with the registered marketing program eligible spending and socially connected consumers is compared with requirements data 109 by monitoring module 131.

In one embodiment, if monitoring module 131 determines the spending data associated with the registered marketing program eligible spending and socially connected consumers indicates the marketing program requirements of requirements data 109 have been met, the registered marketing program eligible spending and socially connected consumers are provided the benefits of the social group-based marketing program of marketing program data 107.

Those of skill in the art will readily recognize that the components shown in FIG. 1, such as consumer systems 100A, 100B through 100N; marketing program database 110; process system 120; social media system 150; communications channels 161, 163, 165, 167, and 169, and their respective components, are shown for illustrative purposes only and that architectures with more or fewer components can implement, and benefit from, the invention. Moreover, one or more components of consumer systems 100A, 100B through 100N; marketing program database 110; process system 120; social media system 150; communications channels 161, 163, 165, 167, and 169, may be located remotely from their respective system and accessed via network, as discussed herein. In addition, the particular type of, and configuration of, consumer systems 100A, 100B through 100N; marketing program database 110; process system 120; social media system 150; communications channels 161, 163, 165, 167, and 169 and their respective components, are not relevant.

Process

In accordance with one embodiment, marketing program data associated with a social group-based marketing program offered by a merchant is obtained. In one embodiment, the marketing program data includes marketing program eligibility criteria data indicating marketing program eligibility criteria that must be met before consumers are eligible to register to take part in the marketing program. In one embodiment, the marketing program data includes marketing program requirements data that must be met in order for identified eligible consumers to receive the benefits of the social group-based marketing program.

In one embodiment, access to social group identification data identifying two or more socially connected consumers is obtained from a social media system and financial data associated with the two or more socially connected consumers identified in the social group identification data is obtained. In one embodiment, the financial data associated with the two or more socially connected consumers is analyzed to identify two or more spending and socially connected consumers whose financial data includes similar spending transactions in one or more financial categories.

In one embodiment, the financial data associated with the two or more spending and socially connected consumers and the marketing program eligibility criteria data are compared and if the financial data associated with the two or more spending and socially connected consumers matches the marketing program eligibility criteria data, the two or more spending and socially connected consumers are designated marketing program eligible spending and socially connected consumers.

In one embodiment, the identified marketing program eligible spending and socially connected consumers are invited to register for the social group-based marketing program and the program eligible spending and socially connected consumers responding to the invitation and providing registration data are designated registered marketing program eligible spending and socially connected consumers. In one embodiment, the spending data associated with the registered marketing program eligible spending and socially connected consumers is obtained and/or monitored and compared with the marketing program requirements data. In one embodiment, when the spending data associated with the registered marketing program eligible spending and socially connected consumers indicates the marketing program requirements of the marketing program requirements data have been met, the registered marketing program eligible spending and socially connected consumers are provided the benefits of the social group-based marketing program.

Figure 2:
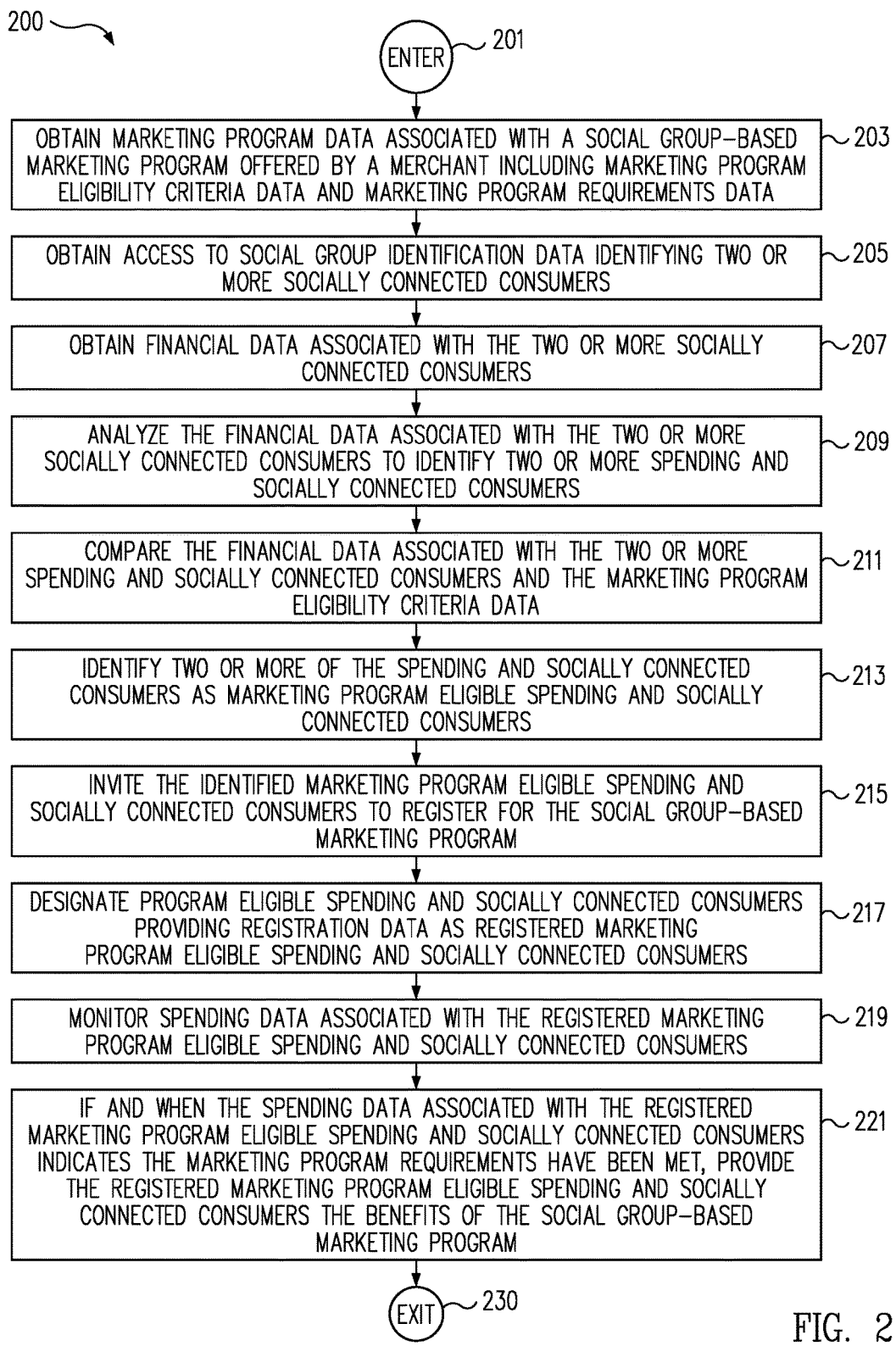
FIG. 2 is a flow chart depicting one embodiment of a process for linking social media systems and financial management systems to provide social group-based marketing programs in accordance with one embodiment.

FIG. 2 is a flow chart depicting a process 200 for linking social media systems and financial management systems to provide social group-based marketing programs in accordance with one embodiment. Process 200 for linking social media systems and financial management systems to provide social group-based marketing programs begins at ENTER OPERATION 201 of FIG. 2 and process flow proceeds to OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203.

In one embodiment, at OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 marketing program data associated with a social group-based marketing program offered by a merchant is obtained.

In one embodiment, the marketing program data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 includes data indicating the benefits available through/associated with the social group-based marketing program. In various embodiments, the benefits available through/associated with the social group-based marketing program include a refund of the purchase price paid to the merchant by each of socially connected consumers who are eligible for, register with, and meet the requirements of, the social group-based marketing program.

Herein, as discussed below, socially connected consumers who are eligible for, register with, and meet the requirements of, the social group-based marketing program are referred to as registered marketing program eligible spending and socially connected consumers.

In one embodiment, the refund of the purchase price is provided to the registered marketing program eligible spending and socially connected consumers by refund transactions to credit or debit cards used by the registered marketing program eligible spending and socially connected consumers to pay the merchant. In other embodiments, the refund of the purchase price is provided to the registered marketing program eligible spending and socially connected consumers via check, and/or voucher, and/or coupon, and/or any other marketing device.

Herein, the terms "coupon" and "marketing device" are used interchangeable to include traditional and/or electronic media based marketing devices, mobile coupons/marketing devices, virtual coupons/marketing devices offered as screen displays on computing systems, promotional certificates, vouchers, discount certificates, discount vouchers, sales offers, advertisements, and/or any other marketing tool and/or device, distributed by any distribution means, as discussed herein, and/or as known in the art at the time of filing, and/or as developed after the time of filing.

In one embodiment, the refund of the purchase price is provided to the registered marketing program eligible spending and socially connected consumers by providing a store credit with the merchant for use in making future purchases.

In other embodiments, the refund of the purchase price is provided to the registered marketing program eligible spending and socially connected consumers via any means for providing a refund as discussed herein, and/or as known in the art at the time of filing, and/or as developed after the time of filing.

In various embodiments, the benefits available through/associated with the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 include a discount provided to each of the registered marketing program eligible spending and socially connected consumers on future purchases from the merchant.

In various embodiments, the discount is provided to each of the registered marketing program eligible spending and socially connected consumers on future purchases from the merchant via voucher, and/or coupon, and/or any other marketing device, as discussed herein, and/or as known in the art at the time of filing, and/or as developed after the time of filing.

In other embodiments, the discount is provided to each of the registered marketing program eligible spending and socially connected consumers on future purchases from the merchant via any means for providing a discount on future purchases, as discussed herein, and/or as known in the art at the time of filing, and/or as developed after the time of filing.

In various embodiments, the benefits available through/ associated with the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 include a refund of the purchase price paid to the merchant by each of the registered marketing program eligible spending and socially connected consumers for defined products and/or services purchased.

In one embodiment, the refund is provided to the registered marketing program eligible spending and socially connected consumers by refund transactions to credit or debit cards used by the registered marketing program eligible spending and socially connected consumers to pay the merchant. In other embodiments, the refund is provided to the registered marketing program eligible spending and socially connected consumers via check, and/or voucher, and/or coupon, and/or any other marketing device.

In one embodiment, the refund is provided to the registered marketing program eligible spending and socially connected consumers by providing a store credit with the merchant for use in making future purchases.

In other embodiments, the refund is provided to the registered marketing program eligible spending and socially connected consumers via any means for providing a refund as discussed herein, and/or as known in the art at the time of filing, and/or as developed after the time of filing.

In various embodiments, the benefits available through/ associated with the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 include a discount provided to each of the registered marketing program eligible spending and socially connected consumers on future purchases from the merchant of defined products and/or services.

In one embodiment, the discount is provided to each of the registered marketing program eligible spending and socially connected consumers on future purchases from the merchant via voucher, and/or coupon, and/or any other marketing device, as discussed herein, and/or as known in the art at the time of filing, and/or as developed after the time of filing.

In other embodiments, the discount is provided to each of the registered marketing program eligible spending and socially connected consumers on future purchases from the merchant via any means for providing a discount on future purchases, as discussed herein, and/or as known in the art at the time of filing, and/or as developed after the time of filing.

In various embodiments, the benefits available through/ associated with the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 include any benefit, or combination benefits, defined by the merchant, as discussed herein, and/or as known in the art at the time of filing, and/or as developed after the time of filing.

In one embodiment, the marketing program data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 includes marketing program eligibility criteria data indicating marketing program eligibility criteria that must be met before consumers are eligible to register to take part in the marketing program.

In one embodiment, using the marketing program eligibility criteria data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 a merchant can ensure that the marketing program, and marketing program benefits, is/are offered to consumers who are "high value potential customers", i.e., consumers who are most likely to be motivated by the marketing device to make a purchase of a given product and/or service, and to become a "regular" or repeat customer.

In one embodiment, the marketing program data includes marketing program eligibility criteria data indicating the marketing program eligibility criterion that the group of consumers must have historically spent a threshold amount of money individually with one or more identified product and/or service providers other than the merchant. In one embodiment, this marketing program eligibility criterion ensures that the group of consumers have historically, and individually, been threshold level purchasers of products and/or services offered by the merchant, and that, through the social group-based marketing program, the merchant may actually be drawing customers away from a competitor.

In one embodiment, the marketing program data includes marketing program eligibility criteria data indicating the marketing program eligibility criterion that the group of consumers must have historically spent a threshold amount of money collectively with one or more identified product and/or service providers other than the merchant. In one embodiment, this marketing program eligibility criterion ensures that the group of consumers have historically, and collectively, been threshold level purchasers of products and/or services offered by the merchant, and that, through the social group-based marketing program, the merchant may actually be drawing customers away from a competitor.

In one embodiment, the marketing program data includes marketing program eligibility criteria data indicating the marketing program eligibility criterion that the group of consumers must have historically spent a defined threshold amount of money individually in a defined financial category. In one embodiment, this marketing program eligibility criterion ensures that the group of consumers have historically, and individually, been threshold level purchasers in a financial category associated with products and/or services offered by the merchant.

In one embodiment, the marketing program data includes marketing program eligibility criteria data indicating the marketing program eligibility criterion that the group of consumers must have historically spent a defined threshold amount of money collectively in a defined financial category. In one embodiment, this marketing program eligibility criterion ensures that the group of consumers have historically, and collectively, been threshold level purchasers in a financial category associated with products and/or services offered by the merchant.

In one embodiment, the marketing program data includes marketing program eligibility criteria data indicating the marketing program eligibility criterion that the group of consumers must individually have a defined threshold income and/or discretionary spending budget. In one embodiment, this marketing program eligibility criterion ensures the consumers individually have an income level, and/or a spending capability, desired by the merchant.

In one embodiment, the marketing program data includes marketing program eligibility criteria data indicating the marketing program eligibility criterion that the group of consumers must collective have a defined threshold income and/or discretionary spending budget. In one embodiment, this marketing program eligibility criterion ensures the consumers collectively have an income level, and/or a spending capability, desired by the merchant.

In one embodiment, the marketing program data includes marketing program eligibility criteria data indicating the marketing program eligibility criterion that the group of consumers must individually meet defined demographics. In one embodiment, this marketing program eligibility criterion ensures the consumers individually have characteristics, such a home address zip code, or age group, or marital status, desired by the merchant.

In one embodiment, the marketing program data includes marketing program eligibility criteria data indicating the marketing program eligibility criterion that the group of consumers must collectively meet defined demographics. In one embodiment, this marketing program eligibility criterion ensures the consumers collectively have characteristics, such a home address zip code, or age group, or marital status, desired by the merchant.

In one embodiment, the marketing program data includes marketing program eligibility criteria data indicating any of the marketing program eligibility criterion, or combination of marketing program eligibility criteria, desired by the merchant, and/or as discussed herein, and/or as known in the art at the time of filing, and/or as developed after the time of filing.

In one embodiment, the marketing program data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 includes marketing program requirements data that must be met in order for consumers to receive the benefits of the social group-based marketing program.

In one embodiment, the marketing program requirements data includes data indicating the marketing program requirement that the group of consumers must individually spend a defined threshold amount of money with the merchant in a defined timeframe in order to receive the benefits of the social group-based marketing program.

In one embodiment, the marketing program requirements data includes data indicating the marketing program requirement that the group of consumers must collectively spend a defined threshold amount of money with the merchant in a defined timeframe in order for the consumers to receive the benefits of the social group-based marketing program.

In one embodiment, the marketing program requirements data includes data indicating the marketing program requirement that the group of consumers must individually spend a defined threshold amount of money on defined products and/or services from the merchant in a defined timeframe in order for the consumers to receive the benefits of the social group-based marketing program.

In one embodiment, the marketing program requirements data includes data indicating the marketing program requirement that the group of consumers must collectively spend a defined threshold amount of money on defined products and/or services from the merchant in a defined timeframe in order for the consumers to receive the benefits of the social group-based marketing program.

In one embodiment, the marketing program requirements data includes data indicating the marketing program requirement that the group of consumers must individually make a threshold number of purchases from the merchant in a defined timeframe in order for the consumers to receive the benefits of the social group-based marketing program.

In one embodiment, the marketing program requirements data includes data indicating the marketing program requirement that the group of consumers must collectively make a threshold number of purchases from the merchant in a defined timeframe in order for the consumers to receive the benefits of the social group-based marketing program.

In one embodiment, the marketing program data includes the marketing program requirements data indicating any of the marketing program requirements, or combination of the marketing program requirements, desired by the merchant, and/or as discussed herein, and/or as known in the art at the time of filing, and/or as developed after the time of filing.

In one embodiment, at OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 marketing program data associated with multiple social group-based marketing programs, and/or offered by multiple merchants, is obtained and the marketing program data is organized according to the merchant offering the social group-based marketing programs, and/or the marketing program eligibility criteria data associated with the social group-based marketing programs, and/or the marketing program requirements data associated with the social group-based marketing programs. In one embodiment, at OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 the organized marketing program data associated with multiple social group-based marketing programs, and/or offered by multiple merchants, is then stored in a marketing program database or other data store, as discussed herein, known at the time of filing, or as developed thereafter.

In one embodiment, once marketing program data associated with a social group-based marketing program offered by a merchant is obtained at OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203, process flow proceeds to OBTAIN ACCESS TO SOCIAL GROUP IDENTIFICATION DATA IDENTIFYING TWO OR MORE SOCIALLY CONNECTED CONSUMERS OPERATION 205.

In one embodiment, at OBTAIN ACCESS TO SOCIAL GROUP IDENTIFICATION DATA IDENTIFYING TWO OR MORE SOCIALLY CONNECTED CONSUMERS OPERATION 205 access to social group identification data identifying two or more socially connected consumers is obtained from a social media system.

Currently available social media systems provide accounts, or a presence, for a consumer where the consumer can post entries, typically text entries of a defined size. The consumer's entries are then made viewable, e.g., are "broadcast" or "posted" to other consumers/users socially connected to the posting consumer, who link to the consumer's account/page and/or otherwise indicate they wish to see, and be informed of, the consumer's posted entries.

One important feature of currently available social media systems is that social contacts, i.e., friends and associates, of a consumer are linked to/displayed in the consumer's page or presence on the social media system. In short, a feature of many social media systems is that a listing of social contacts associated with a consumer is provided through the social media system along with contact information for those social contacts.

Examples of currently available social media systems include, but are not limited to, Facebook™, MySpace™, Linkedin™, and Twitter™.

In one embodiment, at OBTAIN ACCESS TO SOCIAL GROUP IDENTIFICATION DATA IDENTIFYING TWO OR MORE SOCIALLY CONNECTED CONSUMERS OPERATION 205 access to a social media account associated with the consumer is obtained from the consumer. In one embodiment, once access is provided to the social media account associated with the consumer, the list of social contacts associated with the consumer is accessed and data identifying two or more socially connected consumers associated with the consumer is obtained. In this way, at OBTAIN ACCESS TO SOCIAL GROUP IDENTIFICATION DATA IDENTIFYING TWO OR MORE SOCIALLY CONNECTED CONSUMERS OPERATION 205 relatively accurate data indicating two or more socially connected consumers, including the original consumer, is obtained.

In various embodiments, access to social group identification data identifying the two or more socially connected consumers is obtained at OBTAIN ACCESS TO SOCIAL GROUP IDENTIFICATION DATA IDENTIFYING TWO OR MORE SOCIALLY CONNECTED CONSUMERS OPERATION 205 from any source of data identifying two or more socially connected consumers, as discussed herein, and/or as known in the art at the time of filing, and/or as made available after the time of filing.

In one embodiment, once access to social group identification data identifying two or more socially connected consumers is obtained from a social media system at OBTAIN ACCESS TO SOCIAL GROUP IDENTIFICATION DATA IDENTIFYING TWO OR MORE SOCIALLY CONNECTED CONSUMERS OPERATION 205, process flow proceeds to OBTAIN FINANCIAL DATA ASSOCIATED WITH THE TWO OR MORE SOCIALLY CONNECTED CONSUMERS OPERATION 207.

In one embodiment, at OBTAIN FINANCIAL DATA ASSOCIATED WITH THE TWO OR MORE SOCIALLY CONNECTED CONSUMERS OPERATION 207 financial data associated with the two or more socially connected consumers of OBTAIN ACCESS TO SOCIAL GROUP IDENTIFICATION DATA IDENTIFYING TWO OR MORE SOCIALLY CONNECTED CONSUMERS OPERATION 205 is obtained.

In one embodiment, the financial transaction data of OBTAIN FINANCIAL DATA ASSOCIATED WITH THE TWO OR MORE SOCIALLY CONNECTED CONSUMERS OPERATION 207 includes data indicating purchases made by the two or more socially connected consumers using one or more financial accounts associated the two or more socially connected consumers.

In one embodiment, the two or more socially connected consumers all use a common financial management system. In one embodiment, at OBTAIN FINANCIAL DATA ASSOCIATED WITH THE TWO OR MORE SOCIALLY CONNECTED CONSUMERS OPERATION 207 financial transaction data is obtained through the common financial management system, such as a financial transaction management system, that implements, includes, is accessible by, and/or is otherwise associated with, process 200 for linking social media systems and financial management systems to provide social group-based marketing programs, and/or the two or more socially connected consumers.

Examples of currently available types of financial management systems include, but are not limited to, computing system implemented and/or on-line personal financial management systems, packages, programs, modules, or applications; computing system implemented and/or on-line personal financial transaction management systems, packages, programs, modules, or applications; computing system implemented and/or on-line personal tax preparation systems, packages, programs, modules, or applications; computing system implemented and/or on-line personal banking systems, packages, programs, modules, or applications; and computing system implemented and/or on-line personal accounting systems, packages, programs, modules, or applications.

In one embodiment, once financial data associated with the two or more socially connected consumers of OBTAIN ACCESS TO SOCIAL GROUP IDENTIFICATION DATA IDENTIFYING TWO OR MORE SOCIALLY CONNECTED CONSUMERS OPERATION 205 is obtained at OBTAIN FINANCIAL DATA ASSOCIATED WITH THE TWO OR MORE SOCIALLY CONNECTED CONSUMERS OPERATION 207, process flow proceeds to ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the financial data associated with the two or more socially connected consumers of OBTAIN FINANCIAL DATA ASSOCIATED WITH THE TWO OR MORE SOCIALLY CONNECTED CONSUMERS OPERATION 207 is analyzed and compared to identify two or more spending and socially connected consumers whose financial data includes similar spending transactions in one or more financial categories.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions categorized by the financial management system in the same, or similar, financial category. As a specific illustrative example, in one embodiment, the two or more spending and socially connected consumers are identified based on their having transaction data indicating spending transactions categorized by the financial management system as "dining out", and/or "entertainment".

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions categorized by the financial management system in the same, or similar, financial category and conducted in the same geographic area. As a specific illustrative example, in one embodiment, the two or more spending and socially connected consumers are identified based on their having transaction data indicating spending transactions categorized by the financial management system as "dining out", and/or "entertainment" and taking place in the same city, or ZIP Code.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions categorized by the financial management system in the same, or similar, financial category and conducted in the same timeframe. As a specific illustrative example, in one embodiment, the two or more spending and socially connected consumers are identified based on their having transaction data indicating spending transactions categorized by the financial management system as "dining out", and/or "entertainment" and taking place within the same month, and/or on the same day of the week, such as on a weekend day.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions categorized by the financial management system in the same, or similar, financial category and indicating a similar cumulative spending amount in the financial category in a defined timeframe. As a specific illustrative example, in one embodiment, the two or more spending and socially connected consumers are identified based on their having transaction data indicating spending transactions categorized by the financial management system as "dining out", and/or "entertainment" and totaling approximately $300 per month.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions conducted with similar merchants, i.e., having similar payees. As a specific illustrative example, in one embodiment, the two or more spending and socially connected consumers are identified based on their having transaction data indicating spending transactions having payees which are Italian restaurants.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating spending transactions conducted with the same merchants, i.e., having the same payees. As a specific illustrative example, in one embodiment, the two or more spending and socially connected consumers are identified based on their having transaction data indicating spending transactions having a payee which is a specific Italian restaurant, or restaurant chain.

In one embodiment, at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 the two or more spending and socially connected consumers are identified based on their having financial transaction data indicating any similar spending habits of interest to the merchant and/or as discussed herein, and/or as known in the art at the time of filing, and/or as becomes known after the time of filing.

In one embodiment, once the financial data associated with the two or more socially connected consumers of OBTAIN FINANCIAL DATA ASSOCIATED WITH THE TWO OR MORE SOCIALLY CONNECTED CONSUMERS OPERATION 207 is analyzed and compared to identify two or more spending and socially connected consumers whose financial data includes similar spending transactions in one or more financial categories at ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209, process flow proceeds to COMPARE THE FINANCIAL DATA ASSOCIATED WITH THE TWO OR MORE SPENDING AND SOCIALLY CONNECTED CONSUMERS AND THE MARKETING PROGRAM ELIGIBILITY CRITERIA DATA OPERATION 211

In one embodiment, at COMPARE THE FINANCIAL DATA ASSOCIATED WITH THE TWO OR MORE SPENDING AND SOCIALLY CONNECTED CONSUMERS AND THE MARKETING PROGRAM ELIGIBILITY CRITERIA DATA OPERATION 211 the financial data associated with the two or more spending and socially connected consumers of ANALYZE THE FINANCIAL DATA ASSOCIATED WITH THE TWO OR MORE SOCIALLY CONNECTED CONSUMERS TO IDENTIFY TWO OR MORE SPENDING AND SOCIALLY CONNECTED CONSUMERS OPERATION 209 and the marketing program eligibility criteria data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 are compared.

In one embodiment, once the financial data associated with the two or more spending and socially connected consumers and the marketing program eligibility criteria data are compared at COMPARE THE FINANCIAL DATA ASSOCIATED WITH THE TWO OR MORE SPENDING AND SOCIALLY CONNECTED CONSUMERS AND THE MARKETING PROGRAM ELIGIBILITY CRITERIA DATA OPERATION 211, process flow proceeds to IDENTIFY TWO OR MORE OF THE SPENDING AND SOCIALLY CONNECTED CONSUMERS AS MARKETING PROGRAM ELIGIBLE SPENDING AND SOCIALLY CONNECTED CONSUMERS OPERATION 213

In one embodiment, at IDENTIFY TWO OR MORE OF THE SPENDING AND SOCIALLY CONNECTED CONSUMERS AS MARKETING PROGRAM ELIGIBLE SPENDING AND SOCIALLY CONNECTED CONSUMERS OPERATION 213 if the financial data associated with the two or more spending and socially connected consumers matches the marketing program eligibility criteria data at COMPARE THE FINANCIAL DATA ASSOCIATED WITH THE TWO OR MORE SPENDING AND SOCIALLY CONNECTED CONSUMERS AND THE MARKETING PROGRAM ELIGIBILITY CRITERIA DATA OPERATION 211, i.e., if the financial data indicates the two or more spending and socially connected consumers meet the eligibility criteria indicated in the marketing program eligibility criteria data, data indicating the designation of the two or more spending and socially connected consumers is transformed to indicate a designation of marketing program eligible spending and socially connected consumers.

In one embodiment, once data indicating the designation of the two or more spending and socially connected consumers is transformed to indicate a designation of marketing program eligible spending and socially connected consumers at IDENTIFY TWO OR MORE OF THE SPENDING AND SOCIALLY CONNECTED CONSUMERS AS MARKETING PROGRAM ELIGIBLE SPENDING AND SOCIALLY CONNECTED CONSUMERS OPERATION 213, process flow proceeds to INVITE THE IDENTIFIED MARKETING PROGRAM ELIGIBLE SPENDING AND SOCIALLY CONNECTED CONSUMERS TO REGISTER FOR THE SOCIAL GROUP-BASED MARKETING PROGRAM OPERATION 215

In one embodiment, at INVITE THE IDENTIFIED MARKETING PROGRAM ELIGIBLE SPENDING AND SOCIALLY CONNECTED CONSUMERS TO REGISTER FOR THE SOCIAL GROUP-BASED MARKETING PROGRAM OPERATION 215 the identified marketing program eligible spending and socially connected consumers of IDENTIFY TWO OR MORE OF THE SPENDING AND SOCIALLY CONNECTED CONSUMERS AS MARKETING PROGRAM ELIGIBLE SPENDING AND SOCIALLY CONNECTED CONSUMERS OPERATION 213 are invited to register for the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203.

In one embodiment, the marketing program eligible spending and socially connected consumers are informed of the social group-based marketing program they are eligible for, and invited to register with the social group-based marketing program, in one embodiment, through the social media system.

In one embodiment, the marketing program eligible spending and socially connected consumers are informed of the social group-based marketing program they are eligible for, and invited to register with the social group-based marketing program, via any mechanism for informing the marketing program eligible spending and socially connected consumers of the social group-based marketing program, and inviting them to register, such as, but not limited to, email, voicemail, text message, phone message and POTS, and/or any other means or mechanism for contacting the marketing program eligible spending and socially connected consumers, as discussed herein, and/or as known in the art at the time of filing, and/or as developed/made available after the time of filing.

In one embodiment, once the identified marketing program eligible spending and socially connected consumers are invited to register for the social group-based marketing program at INVITE THE IDENTIFIED MARKETING PROGRAM ELIGIBLE SPENDING AND SOCIALLY CONNECTED CONSUMERS TO REGISTER FOR THE SOCIAL GROUP-BASED MARKETING PROGRAM OPERATION 215, process flow proceeds to DESIGNATE PROGRAM ELIGIBLE SPENDING AND SOCIALLY CONNECTED CONSUMERS PROVIDING REGISTRATION DATA AS REGISTERED MARKETING PROGRAM ELIGIBLE SPENDING AND SOCIALLY CONNECTED CONSUMERS OPERATION 217.

In one embodiment, at DESIGNATE PROGRAM ELIGIBLE SPENDING AND SOCIALLY CONNECTED CONSUMERS PROVIDING REGISTRATION DATA AS REGISTERED MARKETING PROGRAM ELIGIBLE SPENDING AND SOCIALLY CONNECTED CONSUMERS OPERATION 217, data indicating the designation of all of the marketing program eligible spending and socially connected consumers who respond to the invitation of INVITE THE IDENTIFIED MARKETING PROGRAM ELIGIBLE SPENDING AND SOCIALLY CONNECTED CONSUMERS TO REGISTER FOR THE SOCIAL GROUP-BASED MARKETING PROGRAM OPERATION 215 and register with the socially group-based marketing program is transformed to data designating the marketing program eligible spending and socially connected consumers who respond to the invitation and register with the socially group-based marketing program as registered marketing program eligible spending and socially connected consumers.

In one embodiment, once data indicating the designation of all of the marketing program eligible spending and socially connected consumers who respond to the invitation and register with the socially group-based marketing program is transformed to data designating the marketing program eligible spending and socially connected consumers who respond to the invitation and register with the socially group-based marketing program as registered marketing program eligible spending and socially connected consumers at DESIGNATE PROGRAM ELIGIBLE SPENDING AND SOCIALLY CONNECTED CONSUMERS PROVIDING REGISTRATION DATA AS REGISTERED MARKETING PROGRAM ELIGIBLE SPENDING AND SOCIALLY CONNECTED CONSUMERS OPERATION 217, process flow proceeds to MONITOR SPENDING DATA ASSOCIATED WITH THE REGIS- TERED MARKETING PROGRAM ELIGIBLE SPENDING AND SOCIALLY CONNECTED CONSUMERS OPERATION 219.

In one embodiment, at MONITOR SPENDING DATA ASSOCIATED WITH THE REGISTERED MARKETING PROGRAM ELIGIBLE SPENDING AND SOCIALLY CONNECTED CONSUMERS OPERATION 219 spending data associated with the registered marketing program eligible spending and socially connected consumers of DESIGNATE PROGRAM ELIGIBLE SPENDING AND SOCIALLY CONNECTED CONSUMERS PROVIDING REGISTRATION DATA AS REGISTERED MARKETING PROGRAM ELIGIBLE SPENDING AND SOCIALLY CONNECTED CONSUMERS OPERATION 217 is obtained and/or monitored.

In one embodiment, spending data associated with the registered marketing program eligible spending and socially connected consumers is obtained and/or monitored at MONITOR SPENDING DATA ASSOCIATED WITH THE REGISTERED MARKETING PROGRAM ELIGIBLE SPENDING AND SOCIALLY CONNECTED CONSUMERS OPERATION 219 by monitoring purchase transactions conducted with the merchant offering the social group-based marketing program.

In this embodiment, at MONITOR SPENDING DATA ASSOCIATED WITH THE REGISTERED MARKETING PROGRAM ELIGIBLE SPENDING AND SOCIALLY CONNECTED CONSUMERS OPERATION 219 the spending data associated with each of the registered marketing program eligible spending and socially connected consumers is obtained, analyzed, tracked, and stored via a computing system associated with the merchant, and/or process 200 for linking social media systems and financial management systems to provide social group-based marketing programs.

In one embodiment, spending data associated with the registered marketing program eligible spending and socially connected consumers is obtained and/or monitored at MONITOR SPENDING DATA ASSOCIATED WITH THE REGISTERED MARKETING PROGRAM ELIGIBLE SPENDING AND SOCIALLY CONNECTED CONSUMERS OPERATION 219 by, and/or through, the financial management system whereby the purchase transactions conducted with the merchant offering the social group-based marketing program are identified. In this embodiment, the spending data associated with each of the registered marketing program eligible spending and socially connected consumers is obtained, analyzed, tracked, and stored at MONITOR SPENDING DATA ASSOCIATED WITH THE REGISTERED MARKETING PROGRAM ELIGIBLE SPENDING AND SOCIALLY CONNECTED CONSUMERS OPERATION 219 via the financial management system, and/or process 200 for linking social media systems and financial management systems to provide social group-based marketing programs.

In one embodiment, once spending data associated with the registered marketing program eligible spending and socially connected consumers of DESIGNATE PROGRAM ELIGIBLE SPENDING AND SOCIALLY CONNECTED CONSUMERS PROVIDING REGISTRATION DATA AS REGISTERED MARKETING PROGRAM ELIGIBLE SPENDING AND SOCIALLY CONNECTED CONSUMERS OPERATION 217 is obtained and/or is being monitored at MONITOR SPENDING DATA ASSOCIATED WITH THE REGISTERED MARKETING PROGRAM ELIGIBLE SPENDING AND SOCIALLY CONNECTED CONSUMERS OPERATION 219, process flow proceeds to IF AND WHEN THE SPENDING DATA ASSOCIATED WITH THE REGISTERED MARKETING PROGRAM ELIGIBLE SPENDING AND SOCIALLY CONNECTED CONSUMERS INDICATES THE MARKETING PROGRAM REQUIREMENTS HAVE BEEN MET, PROVIDE THE REGISTERED MARKETING PROGRAM ELIGIBLE SPENDING AND SOCIALLY CONNECTED CONSUMERS THE BENEFITS OF THE SOCIAL GROUP-BASED MARKETING PROGRAM OPERATION 221.

In one embodiment, at IF AND WHEN THE SPENDING DATA ASSOCIATED WITH THE REGISTERED MARKETING PROGRAM ELIGIBLE SPENDING AND SOCIALLY CONNECTED CONSUMERS INDICATES THE MARKETING PROGRAM REQUIREMENTS HAVE BEEN MET, PROVIDE THE REGISTERED MARKETING PROGRAM ELIGIBLE SPENDING AND SOCIALLY CONNECTED CONSUMERS THE BENEFITS OF THE SOCIAL GROUP-BASED MARKETING PROGRAM OPERATION 221 when the spending data associated with the registered marketing program eligible spending and socially connected consumers of MONITOR SPENDING DATA ASSOCIATED WITH THE REGISTERED MARKETING PROGRAM ELIGIBLE SPENDING AND SOCIALLY CONNECTED CONSUMERS OPERATION 219 indicates the marketing program requirements of the marketing program requirements data of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203 have been met, the registered marketing program eligible spending and socially connected consumers are provided the benefits of the social group-based marketing program of OBTAIN MARKETING PROGRAM DATA ASSOCIATED WITH A SOCIAL GROUP-BASED MARKETING PROGRAM OFFERED BY A MERCHANT INCLUDING MARKETING PROGRAM ELIGIBILITY CRITERIA DATA AND MARKETING PROGRAM REQUIREMENTS DATA OPERATION 203.

In one embodiment, as changes in the spending data associated with the registered marketing program eligible spending and socially connected consumers are identified at MONITOR SPENDING DATA ASSOCIATED WITH THE REGISTERED MARKETING PROGRAM ELIGIBLE SPENDING AND SOCIALLY CONNECTED CONSUMERS OPERATION 219, the spending data associated with the registered marketing program eligible spending and socially connected consumers is compared with the marketing program requirements data at IF AND WHEN THE SPENDING DATA ASSOCIATED WITH THE REGISTERED MARKETING PROGRAM ELIGIBLE SPENDING AND SOCIALLY CONNECTED CONSUMERS INDICATES THE MARKETING PROGRAM REQUIREMENTS HAVE BEEN MET, PROVIDE THE REGISTERED MARKETING PROGRAM ELIGIBLE SPENDING AND SOCIALLY CONNECTED CONSUMERS THE BENEFITS OF THE SOCIAL GROUP-BASED MARKETING PROGRAM OPERATION 221.

In one embodiment, when the spending data associated with the registered marketing program eligible spending and socially connected consumers indicates the marketing program requirements of the marketing program requirements data have been met, the registered marketing program eligible spending and socially connected consumers are provided the benefits of the social group-based marketing program at IF AND WHEN THE SPENDING DATA ASSOCIATED WITH THE REGISTERED MARKETING PROGRAM ELIGIBLE SPENDING AND SOCIALLY CONNECTED CONSUMERS INDICATES THE MARKETING PROGRAM REQUIREMENTS HAVE BEEN MET, PROVIDE THE REGISTERED MARKETING PROGRAM ELIGIBLE SPENDING AND SOCIALLY CONNECTED CONSUMERS THE BENEFITS OF THE SOCIAL GROUP-BASED MARKETING PROGRAM OPERATION 221.

As a specific illustrative example, in one embodiment, it is stipulated that the marketing program requirements of the marketing program requirements data include the requirement that each of the registered marketing program eligible spending and socially connected consumers individually spends $30 with the merchant within two months of registering with the social group-based marketing program.

In this specific illustrative example, once the registered marketing program eligible spending and socially connected consumers are identified, the spending data associated with the registered marketing program eligible spending and socially connected consumers is monitored through the financial management system common to these parties and once it is determined that each of the registered marketing program eligible spending and socially connected consumers has spent at least $30 with the merchant within two months of registering with the social group-based marketing program, each of the registered marketing program eligible spending and socially connected consumers is provided the benefits stipulated in the marketing program data associated with the social group-based marketing program.

In one embodiment, once the registered marketing program eligible spending and socially connected consumers are provided the benefits of the social group-based marketing program at IF AND WHEN THE SPENDING DATA ASSOCIATED WITH THE REGISTERED MARKETING PROGRAM ELIGIBLE SPENDING AND SOCIALLY CONNECTED CONSUMERS INDICATES THE MARKETING PROGRAM REQUIREMENTS HAVE BEEN MET, PROVIDE THE REGISTERED MARKETING PROGRAM ELIGIBLE SPENDING AND SOCIALLY CONNECTED CONSUMERS THE BENEFITS OF THE SOCIAL GROUP-BASED MARKETING PROGRAM OPERATION 221, process flow proceeds to EXIT OPERATION 230. In one embodiment, at EXIT OPERATION 230 process 200 for linking social media systems and financial management systems to provide social group-based marketing programs is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process 200 for linking social media systems and financial management systems to provide social group-based marketing programs, high value potential customers are identified based on an analysis of their actual financial transaction data obtained from a financial management system. In addition, groups of socially connected consumers are also identified by leveraging the features of currently available social media systems.

Consequently, using process 200 for linking social media systems and financial management systems to provide social group-based marketing programs, groups of socially connected consumers who are also high value potential customers are reliably identified and the socially connected consumers are efficiently made aware of, and offered the opportunity take part in, a social group-based marketing program relevant to a common interest or spending pattern of the socially connected consumers, as identified based on actual financial transaction data associated with the socially connected consumers. Then, using process 200 for linking social media systems and financial management systems to provide social group-based marketing programs, the socially connected consumers are motivated to take part in the social group-based marketing program by offering the benefits of the group-based marketing program to all of the socially connected consumers only if each of the socially connected consumers performs their portion of the social group-based marketing program requirements.

Consequently, using process 200 for linking social media systems and financial management systems to provide social group-based marketing programs, subtle, but effective, peer pressure is used to motivate each of the socially connected consumers to actively participate in the social group-based marketing program.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for linking social media systems and financial management systems to provide social group-based marketing programs comprising the following, which when executed individually or collectively by any set of one or more processors perform a process including:

obtaining, at a computing system of at least a first consumer, marketing program data associated with a social group-based marketing program offered by a merchant, the marketing program data including marketing program eligibility criteria data indicating marketing program eligibility criteria that must be met before consumers are eligible to register to take part in the marketing program and marketing program requirements data that must be met in order for consumers to receive the benefits of the social group-based marketing program;

obtaining social group identification data identifying two or more socially connected consumers of a social media system, the two or more socially connected consumers at least including the first consumer and a second consumer, the social group identification data being obtained from respective mobile computing systems of the first and second consumers;

continuously monitoring, at a monitoring module of a computing system executing a financial management system common to the first and second socially connected consumers, financial transaction data of the first and second socially connected consumers, at least a portion of the monitored financial transaction data originating at a banking system common to the two or more socially connected consumers;

identifying, through the continuous monitoring performed at the financial management system common to the first and second socially connected consumers, the first and second socially connected consumers as being consumers whose financial transaction data collectively includes at least a threshold total discretionary spending budget;

comparing, at the computing system of the first consumer, the financial transaction data of the first and second socially connected consumers to the marketing program eligibility criteria data;

upon determining, at the computing system of the first consumer, that the financial transaction data of the two or more spending and socially connected consumers matches the marketing program eligibility criteria data, designating the first and second socially connected consumers as marketing program eligible spending and socially connected consumers;

inviting, following the determination, at the computing system of the first consumer, that the financial transaction data associated with the identified marketing program eligible spending and socially connected consumers to register for the social group-based marketing program;

receiving, from at least the computing system of the first consumer, registration data from two or more of the program eligible spending and socially connected consumers and designating the program eligible spending and socially connected consumers providing registration data as registered marketing program eligible spending and socially connected consumers;

further monitoring, at the monitoring module of the computing system executing a financial management system common to the first and second socially connected consumers, spending data of the registered marketing program eligible spending and socially connected consumers;

comparing the spending data of the registered marketing program eligible spending and socially connected consumers with the marketing program requirements data; and when the spending data associated with the registered marketing program eligible spending and socially connected consumers indicates the marketing program requirements of the marketing program requirements data have been met, providing, at computing systems of the first and second consumers, the registered marketing program eligible spending and socially connected consumers the benefits of the social group-based marketing program.

2. The method for linking social media systems and financial management systems to provide social group-based marketing programs of claim 1 wherein the social group-based marketing program benefits include one or more social group-based marketing program benefits selected from the group of social group-based marketing program benefits consisting of:

a refund of the purchase price paid to the merchant by each of the registered marketing program eligible spending and socially connected consumers;

a discount provided to each of the registered marketing program eligible spending and socially connected consumers on future purchases from the merchant;

a refund of the purchase price paid to the merchant by each of the registered marketing program eligible spending and socially connected consumers for defined products and/or services purchased; and a discount provided to each of the registered marketing program eligible spending and socially connected consumers on future purchases from the merchant of defined products and/or services.

3. The method for linking social media systems and financial management systems to provide social group-based marketing programs of claim 1 wherein the marketing program eligibility criteria data includes data indicating at least one marketing program eligibility criteria selected from the group of marketing program eligibility criteria consisting of:

the criterion that the consumers must have historically spent a threshold amount of money individually with one or more identified product and/or service providers other than the merchant;

the criterion that the consumers must have historically spent a threshold amount of money collectively with one or more identified product and/or service providers other than the merchant;

the criterion that the consumers must have historically spent a defined threshold amount of money individually in a defined financial category;

the criterion that the consumers must have historically spent a defined threshold amount of money collectively in a defined financial category;

the criterion that the consumers must individually have a defined threshold income and/or discretionary spending budget;

the criterion that the consumers must individually meet defined demographics; and the criterion that the consumers must collectively meet defined demographics.

4. The method for linking social media systems and financial management systems to provide social group-based marketing programs of claim 1 wherein the marketing program requirements data includes data indicating at least one marketing program requirement chosen from the group of marketing program requirements consisting of:

the requirement that the consumers must individually spend a defined threshold amount of money with the merchant in a defined timeframe;

the requirement that the consumers must collectively spend a defined threshold amount of money with the merchant in a defined timeframe;

the requirement that the consumers must individually spend a defined threshold amount of money on defined products and/or services from the merchant in a defined timeframe;

the requirement that the consumers must collectively spend a defined threshold amount of money on defined products and/or services from the merchant in a defined timeframe;

the requirement that the consumers must individually make a threshold number of purchases from the merchant in a defined timeframe; and the requirement that the consumers must collectively make a threshold number of purchases from the merchant in a defined timeframe.

5. The method for linking social media systems and financial management systems to provide social group-based marketing programs of claim 1 wherein the financial data associated with the two or more socially connected consumers identified in the social group identification data is obtained from a financial management system.

6. The method for linking social media systems and financial management systems to provide social group-based marketing programs of claim 5 wherein the two or more spending and socially connected consumers are identified by similar spending transaction data indicating similar spending in at least one financial category assigned by the financial management system.

7. The method for linking social media systems and financial management systems to provide social group-based marketing programs of claim 5 wherein the two or more spending and socially connected consumers are identified by similar spending transaction data indicating similar spending in at least one financial category assigned by the financial management system and within a defined geographic area.

8. The method for linking social media systems and financial management systems to provide social group-based marketing programs of claim 5 wherein the two or more spending and socially connected consumers are identified by similar spending transaction data indicating similar spending in at least one financial category assigned by the financial management system and within a defined time frame.

9. The method for linking social media systems and financial management systems to provide social group-based marketing programs of claim 5 wherein the two or more spending and socially connected consumers are identified by similar spending transaction data indicating similar payees associated with the spending transaction data.

10. The method for linking social media systems and financial management systems to provide social group-based marketing programs of claim 5 wherein the two or more spending and socially connected consumers are identified by similar spending transaction data indicating the same payees associated with the spending transaction data.

11. A system for linking social media systems and financial management systems to provide social group-based marketing programs comprising:
   a social media system;
   a financial management system;
   at least one processor; and
   at least one memory coupled to the at least one processor, the at least one memory having stored therein instructions which when executed by any set of the at least one processors, perform a process for linking social media systems and financial management systems to provide social group-based marketing programs, the process for linking social media systems and financial management systems to provide social group-based marketing programs including:
   obtaining, at a computing system of at least a first consumer, marketing program data associated with a social group-based marketing program offered by a merchant, the marketing program data including marketing program eligibility criteria data indicating marketing program eligibility criteria that must be met before consumers are eligible to register to take part in the marketing program and marketing program requirements data that must be met in order for consumers to receive the benefits of the social group-based marketing program;
   obtaining social group identification data identifying two or more socially connected consumers of a social media system, the two or more socially connected consumers at least including the first consumer and a second consumer, the social group identification data being obtained from respective mobile computing systems of the first and second consumers;
   continuously monitoring, at a monitoring module of a computing system executing a financial management system common to the first and second socially connected consumers, financial transaction data of the first and second socially connected consumers, at least a portion of the monitored financial transaction data originating at a banking system common to the two or more socially connected consumers;
   identifying, through the continuous monitoring performed at the financial management system common to the first and second socially connected consumers, socially connected consumers whose financial transaction data collectively includes at least a threshold total discretionary spending budget;
   comparing, at the computing system of the first consumer, the financial transaction data of the two or more spending and socially connected consumers and the marketing program eligibility criteria data;
   upon determining, at the computing system of the first consumer, that the financial transaction data associated with the two or more spending and socially connected consumers matches the marketing program eligibility criteria data, designating the first and second socially connected consumers as marketing program eligible spending and socially connected consumers;
   inviting, following the determination, at the computing system of the first consumer, that the financial transaction data associated with the identified marketing program eligible spending and socially connected consumers to register for the social group-based marketing program;
   receiving, from at least the computing system of the first consumer, registration data from two or more of the program eligible spending and socially connected consumers and designating the program eligible spending and socially connected consumers providing registration data as registered marketing program eligible spending and socially connected consumers;
   further monitoring, at the monitoring module of the computing system executing a financial management system common to the first and second socially connected consumers, spending data of the registered marketing program eligible spending and socially connected consumers;
   comparing the spending data of the registered marketing program eligible spending and socially connected consumers with the marketing program requirements data; and
   when the spending data associated with the registered marketing program eligible spending and socially connected consumers indicates the marketing program requirements of the marketing program requirements data have been met, providing, at the mobile computing systems of the first and second consumers, the registered marketing program eligible spending and socially connected consumers the benefits of the social group-based marketing program.

12. The system for linking social media systems and financial management systems to provide social group-based marketing programs of claim 11 wherein the social group-based marketing program benefits include one or more social group-based marketing program benefits selected from the group of social group-based marketing program benefits consisting of:

a refund of the purchase price paid to the merchant by each of the registered marketing program eligible spending and socially connected consumers;

a discount provided to each of the registered marketing program eligible spending and socially connected consumers on future purchases from the merchant;

a refund of the purchase price paid to the merchant by each of the registered marketing program eligible spending and socially connected consumers for defined products and/or services purchased; and a discount provided to each of the registered marketing program eligible spending and socially connected consumers on future purchases from the merchant of defined products and/or services.

13. The system for linking social media systems and financial management systems to provide social group-based marketing programs of claim 11 wherein the marketing program eligibility criteria data includes data indicating at least one marketing program eligibility criteria selected from the group of marketing program eligibility criteria consisting of:

the criterion that the consumers must have historically spent a threshold amount of money individually with one or more identified product and/or service providers other than the merchant;

the criterion that the consumers must have historically spent a threshold amount of money collectively with one or more identified product and/or service providers other than the merchant;

the criterion that the consumers must have historically spent a defined threshold amount of money individually in a defined financial category;

the criterion that the consumers must have historically spent a defined threshold amount of money collectively in a defined financial category;

the criterion that the consumers must individually have a defined threshold income and/or discretionary spending budget;

the criterion that the consumers must individually meet defined demographics; and the criterion that the consumers must collectively meet defined demographics.

14. The system for linking social media systems and financial management systems to provide social group-based marketing programs of claim 11 wherein the marketing program requirements data includes data indicating at least one marketing program requirement chosen from the group of marketing program requirements consisting of:

the requirement that the consumers must individually spend a defined threshold amount of money with the merchant in a defined timeframe;

the requirement that the consumers must collectively spend a defined threshold amount of money with the merchant in a defined timeframe;

the requirement that the consumers must individually spend a defined threshold amount of money on defined products and/or services from the merchant in a defined timeframe;

the requirement that the consumers must collectively spend a defined threshold amount of money on defined products and/or services from the merchant in a defined timeframe;

the requirement that the consumers must individually make a threshold number of purchases from the merchant in a defined timeframe; and the requirement that the consumers must collectively make a threshold number of purchases from the merchant in a defined timeframe.

15. The system for linking social media systems and financial management systems to provide social group-based marketing programs of claim 11 wherein the financial data associated with the two or more socially connected consumers identified in the social group identification data is obtained from a financial management system.

16. The system for linking social media systems and financial management systems to provide social group-based marketing programs of claim 15 wherein the two or more spending and socially connected consumers are identified by similar spending transaction data indicating similar spending in at least one financial category assigned by the financial management system.

17. The system for linking social media systems and financial management systems to provide social group-based marketing programs of claim 15 wherein the two or more spending and socially connected consumers are identified by similar spending transaction data indicating similar spending in at least one financial category assigned by the financial management system and within a defined geographic area.

18. The system for linking social media systems and financial management systems to provide social group-based marketing programs of claim 15 wherein the two or more spending and socially connected consumers are identified by similar spending transaction data indicating similar spending in at least one financial category assigned by the financial management system and within a defined time frame.

19. The system for linking social media systems and financial management systems to provide social group-based marketing programs of claim 15 wherein the two or more spending and socially connected consumers are identified by similar spending transaction data indicating similar payees associated with the spending transaction data.

20. The system for linking social media systems and financial management systems to provide social group-based marketing programs of claim 15 wherein the two or more spending and socially connected consumers are identified by similar spending transaction data indicating the same payees associated with the spending transaction data.

21. A system for linking social media systems and financial management systems to provide social group-based marketing programs comprising:

a social media system;

a financial management system;

at least one processor; and at least one memory coupled to the at least one processor, the at least one memory having stored therein instructions which when executed by any set of the at least one processors, perform a process for linking social media systems and financial management systems to provide social group-based marketing programs, the process for linking social media systems and financial management systems to provide social group-based marketing programs including:

obtaining, at a computing system of at least a first consumer, marketing program data associated with a social group-based marketing program offered by a merchant, the marketing program data including marketing program eligibility criteria data indicating marketing program eligibility criteria that must be met before consumers are eligible to register to take part in the marketing program and marketing program requirements data that must be met in order for consumers to receive the benefits of the social group-based marketing program;

obtaining social group identification data identifying two or more socially connected consumers of a social media system, the two or more socially connected consumers at least including the first consumer and a second consumer, the social group identification data being obtained from respective mobile computing systems of the first and second consumers;

continuously monitoring, at a monitoring module of a computing system executing a financial management system common to the first and second socially connected consumers, financial transaction data of the first and second socially connected consumers identified in the social group identification data from a financial transaction management system, at least a portion of the monitored financial transaction data originating at a banking system common to the two or more socially connected consumers;

identifying, through the continuous monitoring performed at the financial transaction management system common to the first and second socially connected consumers, socially connected consumers whose financial transaction data collectively indicates at least a threshold total discretionary spending budget;

comparing, at the computing system of the first consumer, the financial transaction data of the two or more spending and socially connected consumers and the marketing program eligibility criteria data;

upon determining, at the computing system of the first consumer, that the financial transaction data associated with the two or more spending and socially connected consumers matches the marketing program eligibility criteria data, designating the first and second socially connected consumers as marketing program eligible spending and socially connected consumers;

inviting, following the determination, at the computing system of the first consumer, that the financial transaction data associated with the identified marketing program eligible spending and socially connected consumers to register for the social group-based marketing program;

receiving, from at least the computing system of the first consumer, registration data from two or more of the program eligible spending and socially connected consumers and designating the program eligible spending and socially connected consumers providing registration data as registered marketing program eligible spending and socially connected consumers;

further monitoring, at the monitoring module of the computing system executing a financial management system common to the first and second socially connected consumers, the financial transaction data of the registered marketing program eligible spending and socially connected consumers through the financial transaction management system;

comparing the financial transaction data of the registered marketing program eligible spending and socially connected consumers with the marketing program requirements data; and when the financial transaction data associated with the registered marketing program eligible spending and socially connected consumers indicates the marketing program requirements of the marketing program requirements data have been met, providing, at the mobile computing systems of the first and second consumers, the registered marketing program eligible spending and socially connected consumers the benefits of the social group-based marketing program.

* * * * *